(12) United States Patent
Leleannec et al.

(10) Patent No.: US 12,278,950 B2
(45) Date of Patent: *Apr. 15, 2025

(54) BLOCK SHAPE ADAPTIVE INTRA PREDICTION DIRECTIONS FOR QUADTREE-BINARY TREE

(71) Applicant: INTERDIGITAL VC HOLDINGS, INC., Wilmington, DE (US)

(72) Inventors: Fabrice Leleannec, Betton (FR); Fabien Racape, San Francisco, CA (US); Gagan Rath, Rennes (FR); Fabrice Urban, Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,457

(22) Filed: Oct. 31, 2023

(65) Prior Publication Data
US 2024/0155105 A1     May 9, 2024

Related U.S. Application Data

(63) Continuation of application No. 17/054,561, filed as application No. PCT/US2019/031702 on May 10, 2019, now Pat. No. 11,856,184.

(30) Foreign Application Priority Data

May 14, 2018 (EP) .................................... 18305586
Jul. 16, 2018 (EP) .................................... 18305963
Aug. 6, 2018 (EP) .................................... 18306075

(51) Int. Cl.
H04N 19/105    (2014.01)
H04N 19/11     (2014.01)
(Continued)

(52) U.S. Cl.
CPC .......... H04N 19/105 (2014.11); H04N 19/11 (2014.11); H04N 19/147 (2014.11);
(Continued)

(58) Field of Classification Search
CPC .... H04N 19/105; H04N 19/11; H04N 19/147; H04N 19/159; H04N 19/176; H04N 19/593; H04N 19/96
See application file for complete search history.

(56) References Cited

U.S. PATENT DOCUMENTS 9,532,058 B2    12/2016   Chien et al.
10,404,980 B1    9/2019   Zhao et al.
(Continued)

FOREIGN PATENT DOCUMENTS

CN    102907100    1/2013
CN    103636203    3/2014
(Continued)

OTHER PUBLICATIONS

Wang et al., Overview of the second generation AVS video Coding Standard (AVS2), ZTE Communications, vol. 14, No. 2, Feb. 2, 2016, (Feb. 2, 2016), pp. 3-11—* cited in parent app.
(Continued)

*Primary Examiner* — Dramos Kalapodas
(74) *Attorney, Agent, or Firm* — Ronald Kolczynski

(57) ABSTRACT

A video encoder or decoder processes portions of video using intra coding and with variable block shapes. Under the general aspects, intra prediction directions are adapted to the block shape or aspect ratio. The general aspects described adaptively replace several conventional angular intra prediction modes with wide-angle intra prediction modes for non-square blocks. The total number of angular directions for any block can remain the same as in prior video coding standards or can be reduced or expanded. To keep the same
(Continued)

number of prediction directions, directions along a shorter rectangular edge of a target block are removed but replaced with addition directions along the longer edge of the rectangular target block. For directions with wide angles, reference sample smoothing is performed. Signaling can be provided to inform a corresponding decoder regarding the prediction modes and directions.

15 Claims, 18 Drawing Sheets

(51) Int. Cl.
    *H04N 19/147*      (2014.01)
    *H04N 19/159*      (2014.01)
    *H04N 19/176*      (2014.01)
    *H04N 19/593*      (2014.01)
    *H04N 19/96*      (2014.01)

(52) U.S. Cl.
    CPC ......... *H04N 19/159* (2014.11); *H04N 19/176* (2014.11); *H04N 19/593* (2014.11); *H04N 19/96* (2014.11)

(56) References Cited

U.S. PATENT DOCUMENTS

| | | | |
|---|---|---|---|
| 11,128,872 B2 * | 9/2021 | Van der Auwera | .... H04N 19/52 |
| 11,483,564 B2 | 10/2022 | Lee | |
| 2011/0158314 A1 | 6/2011 | Jeong et al. | |
| 2013/0136175 A1 * | 5/2013 | Wang | ...... H04N 19/11 375/240.12 |
| 2013/0163664 A1 | 6/2013 | Guo et al. | |
| 2013/0272381 A1 | 10/2013 | Guo et al. | |
| 2014/0079121 A1 * | 3/2014 | Song | ...... H04N 19/70 375/240.12 |
| 2014/0198855 A1 | 7/2014 | Sole Rojals et al. | |
| 2016/0100191 A1 | 4/2016 | Mishra et al. | |
| 2017/0094274 A1 | 3/2017 | Chien et al. | |
| 2017/0094285 A1 | 3/2017 | Said et al. | |
| 2017/0272759 A1 | 9/2017 | Seregin et al. | |
| 2017/0374369 A1 | 12/2017 | Chuang et al. | |
| 2018/0176587 A1 | 6/2018 | Panusopone et al. | |
| 2018/0195048 A1 | 7/2018 | Rao | |
| 2018/0288413 A1 | 10/2018 | Filippov et al. | |
| 2019/0068976 A1 | 2/2019 | Yamori | |
| 2019/0208200 A1 | 7/2019 | Galpin et al. | |
| 2019/0356909 A1 | 11/2019 | Lainema | |
| 2019/0373257 A1 | 12/2019 | Liu et al. | |
| 2020/0322601 A1 * | 10/2020 | Ko | ......... H04N 19/70 |
| 2021/0037259 A1 * | 2/2021 | Ko | ...... H04N 19/593 |
| 2021/0044808 A1 * | 2/2021 | Kim | ....... H04N 19/70 |

FOREIGN PATENT DOCUMENTS

| | | |
|---|---|---|
| KR | 101713244 | 3/2017 |
| PH | 12017501445 | 1/2018 |
| RU | 2659733 | 7/2018 |
| WO | 2013023518 | 2/2013 |
| WO | 2018117894 | 6/2018 |
| WO | WO2018117892 | 6/2018 |
| WO | WO-2018117894 A1 * | 6/2018 ............ H04N 19/11 |
| WO | WO2018127624 | 7/2018 |

OTHER PUBLICATIONS

Chen, et al., Joint inter-intra Prediction Based on Mode-Variant and Edge-Directed Weighting Approaches in Video Coding, 2014 IEEE International Conference on Acoustics, Speech and Signal Processing (ICASSP), pp. 7422-7426—* cited in parent app.

Racape, et al., Wide-Angle Intra Prediction for Non-Square Blocks, Ljubljana, SI 11th Meeting, Joint Video Experts Team (JVET) of ITU-T SG 16 WP 3 and ISO/IEC JTC 1/SC 29/WG 11, Jul. 15, 2018—* cited in parent app.

Matsuo, et al., Modification of Intra Angular Prediction in HEVC, Signal & Information Processing Association Annual Summit and Conference (APSIPA ASC), 2012 Asia-Pacific, IEEE, Dec. 3, 2012 (Dec. 3, 2012), pp. 1-4—* cited in parent app.

Huang et al., "EE2/1: Quadtree Plus Binary Tree Structure Integration with JEM Tools", Joint Video Exploration Team (JVET) of ITU-T SG 16 WP 3 and ISO/IEC JTC 1/SC 29/WG 11, Document: JVET-C0024, 3rd Meeting, Geneva Switzerland, May 26, 2016, 5 pages—* cited in parent app.

Sjoberg et al., Description of SDR and HDR Video Coding Technology Proposal by Ericsson and Nokia, 10. JVET Meeting, Apr. 10, 2018-Apr. 20, 2018, San Diego, (The Joint Video Exploration Team of ISO/IEC JTC1/SC29/WG11 and ITU-T SG. 16), URL:http://phenix.int-evry.fr/jvet, No. JVET-J0012-V2, Apr. 13, 2018—* cited in parent app.

Chen et al., "Further improvements to HMKTA-1.0", ITU—Telecommunications Standardization Sector, Study Group 16 Question 6, Video Coding Experts Group (VCEG), Document VCEG-AZ07_v2, 52nd Meeting: Jun. 19-26, 2015, Warsaw, Poland—* cited in parent app.

Anonymous, "Series H: Audiovisual and Multimedia Systems, Infrastructure of audiovisual services—Coding of moving video, High efficiency video coding", ITU-T H.265 Telecommunication Standardization Sector of ITU, Recommendation ITU-T H.265, Oct. 2014, 540 pages—* cited in parent app.

Van Der Auwera et al, "Description of Core Experiment 3: Intra Prediction and Mode Coding", Joint Video Experts Team (JVET) of ITU-T SG 16 WP 3 and ISO/IEC JTC 1/SC 29/WG 11, Document JVET-J1023_r2, 10th Meeting: San Diego, California, USA, Apr. 10, 2018, 49 pages—* cited in parent app.

Rivaz et al., AV1 Bitstream & Decoding Process Specification, 2018, The Alliance for Open Media, pp. 1-650—* cited in parent app.

Lainema, et al., Intra Coding of the HEVC Standard, IEEE Transactions on Circuits and Systems for Video Technology, vol. 22, No. 12, Dec. 1, 2012, pp. 1792-1801—* cited in parent app.

Seregin et al., Block Shape Dependent Intra Mode Coding, Document: JVET-G0159, Joint Video Exploration Team (JVET) of ITU-T SG 16 WP 3 and ISO/IEC JTC 1/SC 29/WG 11 7th Meeting: Torino, IT, Jul. 13-21, 2017—* cited in parent app.

* cited by examiner

BLOCK SHAPE ADAPTIVE INTRA PREDICTION DIRECTIONS FOR QUADTREE-BINARY TREE

FIELD OF THE INVENTION

The present aspects relate to video compression and video encoding and decoding.

BACKGROUND OF THE INVENTION

In the HEVC (High Efficiency Video Coding, ISO/IEC 23008-2, ITU-T H.265) video compression standard, motion compensated temporal prediction is employed to exploit the redundancy that exists between successive pictures of a video.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU).

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to –135 degree over a 180 angle, and they have been maintained in JEM, which has made the definition of angular directions independent of the target block shape.

SUMMARY OF THE INVENTION

The drawbacks and disadvantages of the prior art are addressed by the general aspects described herein, which are directed to block shape adaptive intra prediction directions in encoding and decoding.

According to a first aspect, there is provided a method. The method comprises steps for predicting a video sample belonging to a rectangular block based on at least one sample of a neighboring block lying along a direction based on block shape of the rectangular block; and, encoding the rectangular block using intra prediction based on the predicted video sample.

According to another aspect, there is provided a second method. The method comprises steps for predicting a video sample belonging to a rectangular block based on at least one sample of a neighboring reconstructed block lying along a direction based on block shape of the rectangular block; and, decoding the rectangular block using intra prediction based on the predicted video sample.

According to another aspect, there is provided an apparatus. The apparatus comprises a memory and a processor. The processor can be configured to encode a block of a video or decode a bitstream by executing the either of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
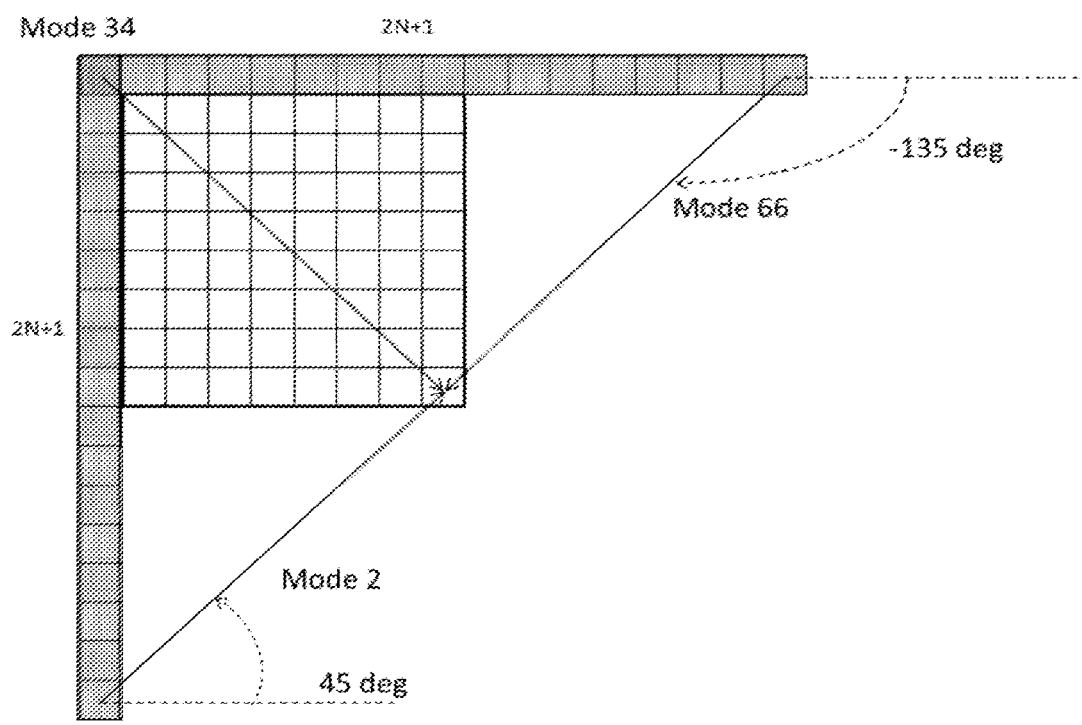
FIG. 1 shows a square target block with its top and left reference arrays.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a Quad Tree (QT) where the blocks have always square shape with equal height and width. In HEVC, the angular intra prediction directions were defined from 45 degree to −135 degree over a 180 angle, and they have been maintained in JEM, which has made the definition of angular directions independent of the target block shape. However, since the idea of partitioning a Coding Tree Unit (CTU) into CUs is to capture objects or parts of objects, and the shape of a block is associated with the directionality of objects, for higher compression efficiency, it is meaningful to adapt the defined prediction directions according to the block shape. In this context, the described general aspects propose to redefine the intra prediction directions for rectangular target blocks.

The general aspects described herein aim at improving the compression performance of conventional video by improving the intra prediction with a QTBT structure. It proposes to adapt intra prediction directions according to the shape of a CU. If the shape of the CU is square, then the already-defined directions in JEM remain unchanged. Otherwise, the searched directions are modified according to the shape of the CU. However, the total number of angular directions for any CU remains unchanged. The aim of adapting the prediction directions to the block shape is to improve the prediction accuracy over the currently defined set of prediction directions, which is independent of block shape.

Furthermore, since the total number of prediction directions for a target CU remains unchanged, the encoding and decoding of the prediction mode using an MPM (Most Probable Mode) set remains unchanged. However, since CUs with different shapes have different defined direction sets, the prediction modes of the neighbor blocks are mapped to the prediction modes of the target block. The mapping is only a re-indexing of the modes, but the actual prediction directions are not changed.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples, which is required to cover the aforementioned angle range for all target pixels. Considering that the height and width of a PU are of equal length, the equality of lengths of two reference arrays also makes sense.

For the next video coding standard, JVET's attempt as Joint Exploration Model (JEM) proposes to use 65 angular intra prediction modes in addition to the planar and DC modes. However, the prediction directions are defined over the same angular range, that is, from 45 degree to −135 degree in clockwise direction. For a target block of size W×H pixels, the top reference array and the left reference array are each of size (W+H+1) pixels, which is required to cover the afore-mentioned angle range for all target pixels. This definition of the angle in JEM was done more for simplicity than for any other specific reason. However, in doing so, some inefficiency was introduced.

In JEM, it has been proposed to use a quadtree-binary tree (QTBT) block partitioning structure instead of only a quadtree structure due to higher compression performance. Unlike QT blocks, which are always of square shape, BT blocks can be rectangular with unequal width and height due to horizontal or vertical binary splitting. In the current JEM code, the aspect ratio of a rectangular block can vary from 2:1 to 8:1. So, the idea of different angular prediction modes is to capture different object directionalities, and the idea of partitioning a CTU into CUs is to capture objects or parts of objects having such directionalities. Therefore, the shape of a target block is structurally related to the directionality of the object in the block. If the shape of a block is rectangular, certain prediction directions may be more likely to occur than others, Therefore, the definition of prediction directions should not be unrelated to the target block shape, which is the case in JEM.

In the case of a square block, there is a structural symmetry. A square block is not only symmetric along both height and width but also it is symmetrically placed with respect to the two reference arrays, as seen in FIG. 1.

FIG. 1 shows a square target block with its top and left reference arrays. The target block is symmetrically placed, with respect to the two reference arrays. The prediction directions are defined from 45 deg to −135 deg in clockwise direction where mode 2 corresponds to 45 deg angle and mode 66 corresponds to −135 deg angle.

In the case of a rectangular block, this is not so with the current defined directions. When the block is flat (i.e, W>H), it is placed closer to the top reference array, but asymmetrically. Similarly, when the block is tall (i.e., W<H), it is placed closer to the left reference array, but asymmetrically. This asymmetry is shown in FIG. 2.

Figure 2:
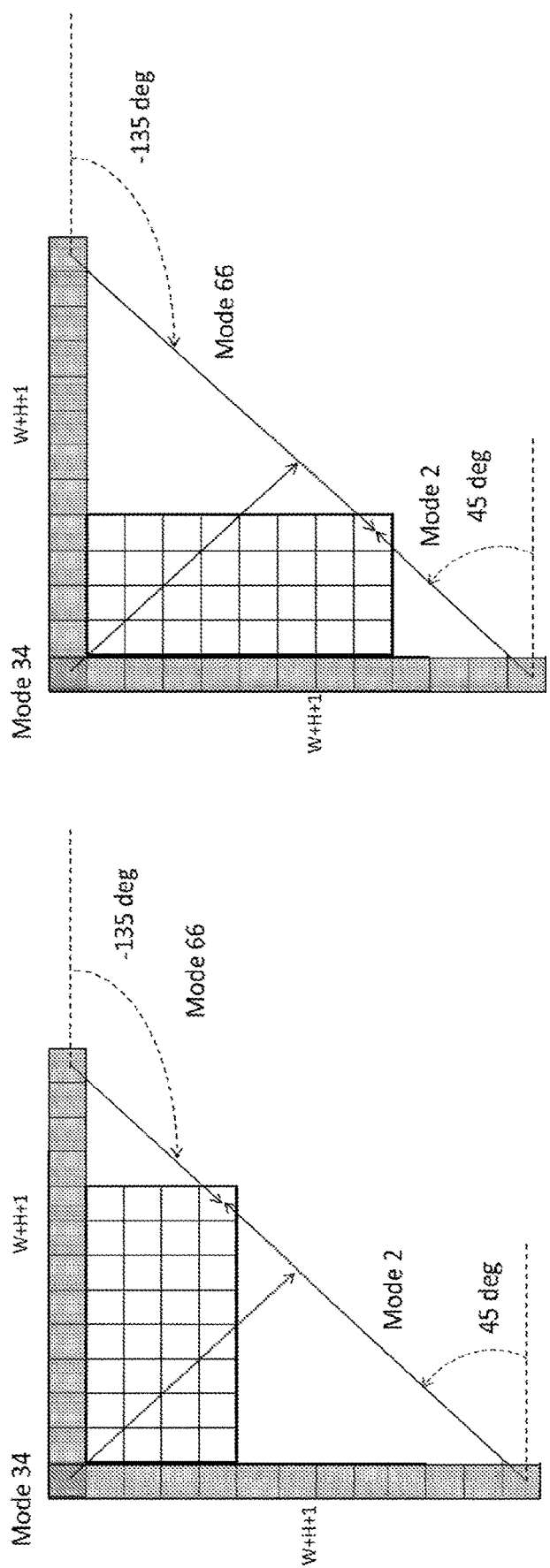
FIG. 2 shows rectangular target blocks (flat block on the left, tall block on the right) with their top and left reference arrays.

FIG. 2 shows rectangular target blocks (flat block on the left, tall block on the right) with their top and left reference arrays. The target blocks are asymmetrically placed with respect to the two reference arrays.

The result of this asymmetry is that for some prediction modes the target pixel will be predicted from a farther reference array whereas the nearer reference array will be excluded because of the defined angles. This is shown in FIG. 3.

Figure 3:
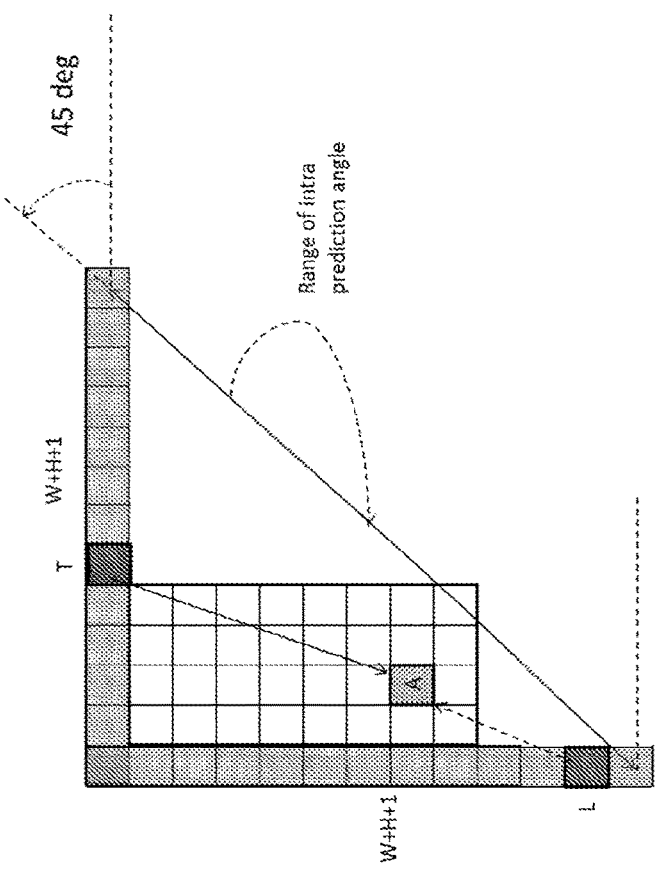
FIG. 3 shows rectangular target blocks (flat block on the left, tall block on the right) with their top and left reference arrays
Figure 3:
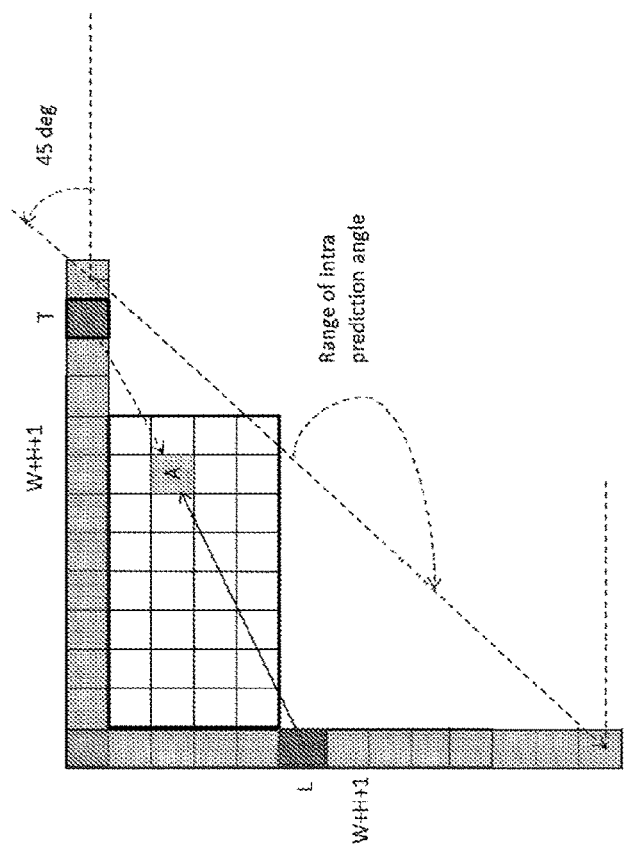

FIG. 3 shows rectangular target blocks (flat block on the left, tall block on the right) with their top and left reference arrays. On the left, the target pixel A has the predictor sample L on the left reference array with a horizontal prediction direction. Though the sample T on the top reference array is nearer, the vertical prediction direction, so that T could be the predictor sample for A, is not allowed in JEM. The right figure shows the analogous case for a target pixel in a tall block.

The flatter or taller a block is (that is, the higher the ratio of the longer side to the shorter side), this asymmetry is more pronounced. Because of the inaccuracy in prediction, such prediction modes become less likely, as seen in actual test results.

Another argument for inefficiency in current defined directions is the equality in number of prediction directions, horizontally and vertically. In JEM, excluding the diagonal mode (mode 34), there are 32 modes in both horizontal and vertical directions. For a square CU, both the height and width being equal, it makes sense to have same number of prediction modes along both horizontal and vertical directions. When the block is rectangular with one side longer than the other, the number of prediction directions in the longer side should be higher simply because of the possibility of higher number of structural directionalities in that side. For a flat block, the ratio of vertical to horizontal mode numbers should be of the order of the ratio of the width to height. Similarly, for a tall block, the ratio of horizontal to vertical mode numbers should be of the order of the ratio of the height to width. A related point to consider is the length of the reference arrays. For a square CU, both height and width being equal, it makes sense to have a same length for the reference arrays. However, for rectangular blocks, intuitively, if the width is greater than height, the top reference array should have more samples than the left one.

Similarly, for blocks with height greater than width, the left reference array should have more samples than the top one. This intuition is based on the fact that a flat (tall) rectangular block has more samples or information along the horizontal (vertical) direction. Likewise, a tall rectangular block has more samples or information along the vertical direction. Therefore, the currently defined directions from 45 deg to −135 degree, which result in equal number of prediction modes in both horizontal and vertical directions, as well as equal lengths of reference arrays, are somewhat inefficient for rectangular blocks.

To solve the above-mentioned issues and to improve the prediction efficiency of rectangular blocks, presented below is a systematic way to define and index the angular prediction modes for various block shapes. Then, in the next section, there will be presented the proposed changes in prediction mode coding to support this mode definition.

In JEM, BT (binary tree) target blocks can have different shapes depending on the lengths of their widths and heights. To define modes that are dependent on a block shape, a generic method is presented below. In this method, the number of prediction modes for any block remains the same as in JEM, but the prediction directions may be different for blocks of different shapes. Besides, a square-shaped block is just a special case having equal height and width, and nothing is changed in this case. In other words, for a square target block, the prediction modes and the associated prediction directions remain unchanged.

Figure 4:
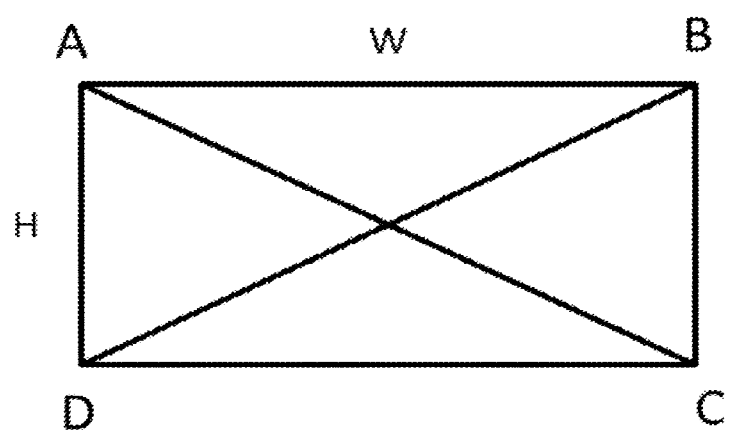
FIG. 4 shows attributes of a rectangular block.

A rectangle is defined by its width W, and height H, as shown in FIG. 4. If A, B, C, and D denote its four vertices, as shown in the figure, then AC is its principal diagonal and BD is its secondary diagonal. A square is a special rectangle when W=H. FIG. 4 shows attributes of a rectangular block.

Figure 5:
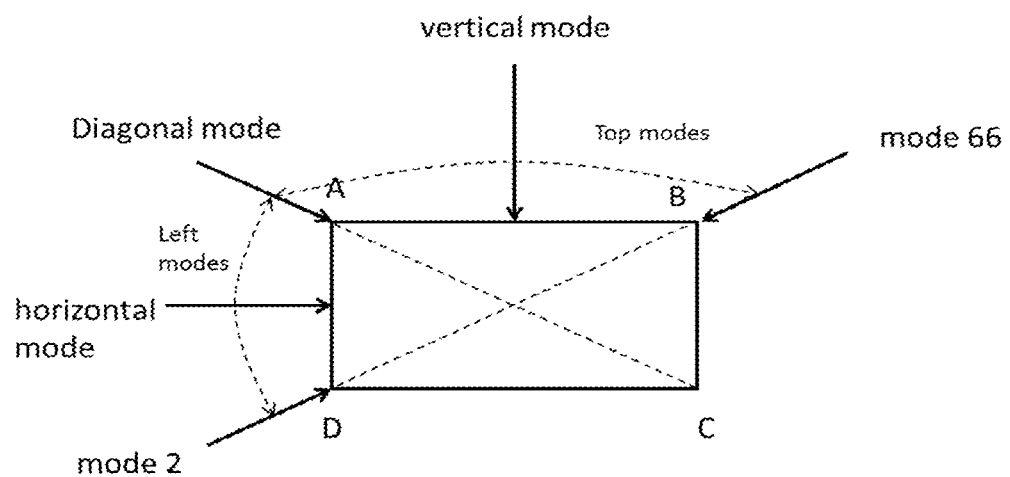
FIG. 5 shows definition of prediction directions for a rectangular block.

For any target block of width W and height H, mode 2 will be associated with the direction from vertex D towards vertex B, mode 66 with the direction from vertex B towards vertex D, along the secondary diagonal, as shown in FIG. 5. The diagonal mode is associated with the direction from vertex A towards vertex C along the principal diagonal. All modes from mode 2 up to the diagonal mode will be termed Left modes. Similarly, all modes from the diagonal mode to mode 66, including the diagonal mode, will be termed Top modes. Left modes are associated with horizontal directions. Similarly, Top modes are associated with vertical directions. The horizontal mode, or purely horizontal mode, is a Left mode that corresponds to the zero-degree angle. The vertical mode, or purely vertical mode, is a Top mode that corresponds to a −90-degree angle.

FIG. 5 shows a definition of prediction directions for a rectangular block. Mode 2 is along the secondary diagonal from vertex D towards vertex B. Mode 66 is along the opposite direction to mode 2. Diagonal mode is along the principal diagonal from vertex A towards vertex C.

Figure 6:
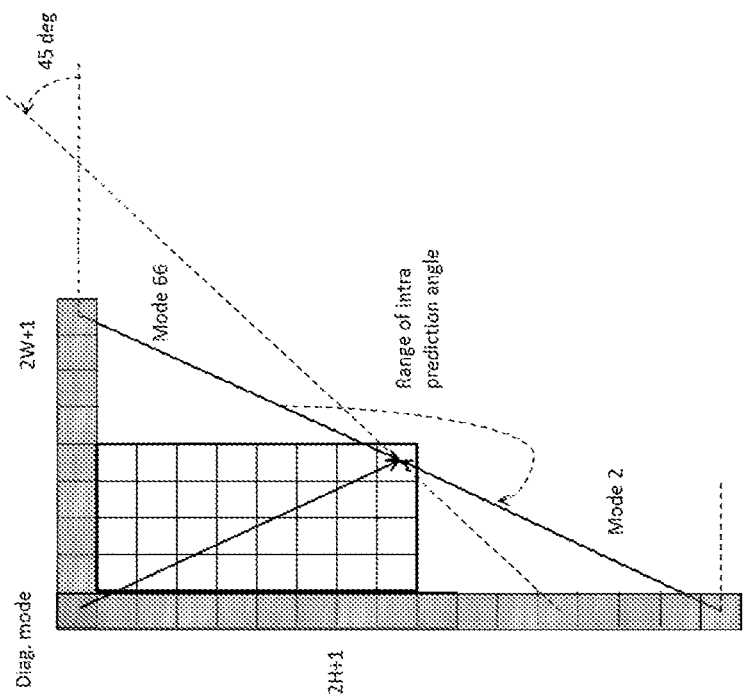
FIG. 6 shows top reference array has length 2 W+1, left reference array has length 2H+1.
Figure 6:
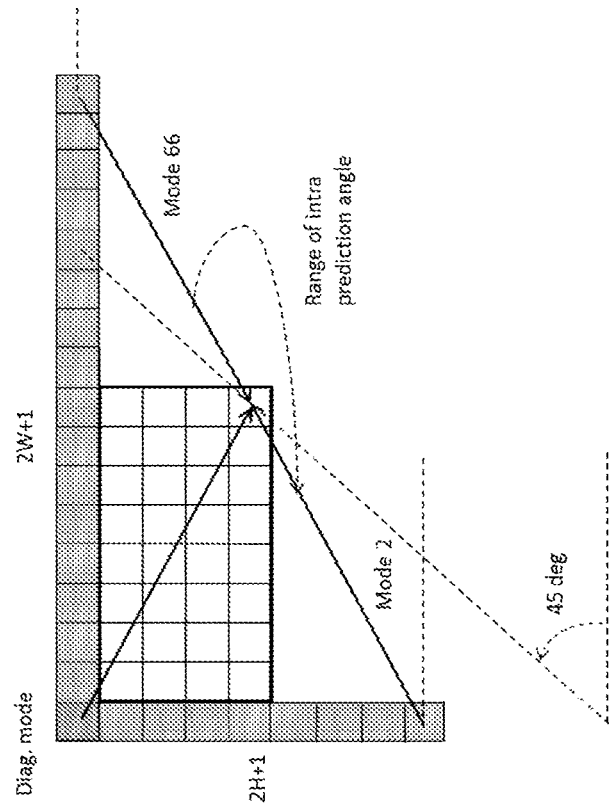

FIG. 6 shows a top reference array has length 2 W+1, left reference array has length 2H+1. The width W and the height H are the dimensions of the white blocks in FIG. 6.

To support these prediction directions, the top reference with length 2 W+1, and the left reference with length 2H+1, are defined as shown in FIG. 6. In the case of a square block, the figure will be identical to that in FIG. 1, where W=H=N.

Notice that, for a flat block, the length of the top reference is larger than that of the left reference array. So are the number of Top modes compared to the Left modes. Similarly, for a tall block, the converse is true. The length of the left reference is larger than that of the top reference array in that case.

Moreover, the location of the block is symmetric with respect to the reference arrays. When the target block is a square, there is perfect symmetry, and the prediction directions and the lengths of reference arrays match the JEM definitions exactly, as in FIG. 1.

The beauty of the above definition is the adaptivity of the prediction directions with the block shape. Notice that, here, the modes 2 and 66 are not defined to correspond to directions along a 45-degree angle and a −135-degree angle, rather the directions along the secondary diagonal. In the case of a flat block, some directions near, and including, 45-degree are removed, but an equal number of directions are added exactly in the opposite directions beyond −135-degree angle. Similarly, in the case of a tall block, some directions near, and including, a −135-degree are removed, but an equal number of directions are added exactly in the opposite directions beyond a 45-degree angle. We will refer to the offset of the mode 2 from 45-degree angle as "modeShift", which is defined as the number of modes removed (between mode 2 and 45-degree angle), or equivalently, the number of modes added (between angle −135-degrees and mode 66). Flat blocks have a positive modeShift whereas tall blocks will have a negative modeShift. For a square block, the modeShift is equal to 0.

Figure 7:
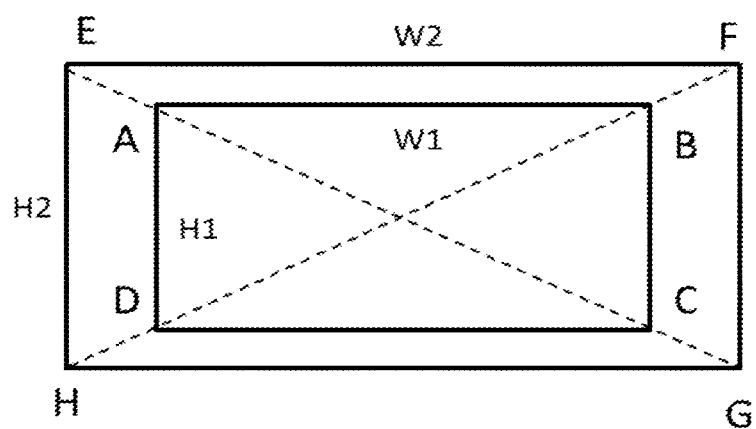
FIG. 7 shows blocks having the same block shape, or aspect ratio, have same prediction directions and hence the same modeShift.

The modeShift of a block represents the offset of its starting mode (that is Mode 2) with respect to the starting mode of a square block. Clearly, it is a function of the shape of the block. The important observation to make is that the modeShift of a block does not depend on the absolute values of its width and height, but rather depends on their ratio. This is illustrated in FIG. 7. Rectangle ABCD (width W1 and height H1) and rectangle EFGH (width W2 and height H2) have the same prediction directions (hence, the same modeShift). Using the similarity of triangles, it can be shown that W1/W2=H1/H2. Therefore W1/H1=W2/H2. Therefore, the blocks having the same ratio of width-toheight (or vice versa) will have the same prediction modes in both horizontal and vertical directions.

FIG. 7 shows blocks having the same aspect ratio (the ratio of width-to-height) have same prediction directions and hence the same modeShift.

The mode number (2-66) is only an index or label for a prediction direction. The corresponding direction is specified by the angle parameter A in HEVC and JEM. The values of A for different prediction modes in JEM are shown in Table 1.

The angle parameters for the directions which are introduced beyond 45-degree or −135-degree angles can be easily derived from the angle parameter of the opposite directions. Consider FIG. 8, where a target pixel is vertically predicted along a prediction direction beyond −135-deg angle. Let W and H denote the width and height of the block. Denote the coordinate of the target pixel as (x,y) where $0<=x<W$ and $0<=y<H$. The horizontal displacement of the predictor sample on the top reference array from the target sample is given by $\Delta_x$. If the prediction direction is extended to intersect the left reference array, the vertical displacement of the intersecting point from the target sample is given as $\Delta_y$.

Figure 8:
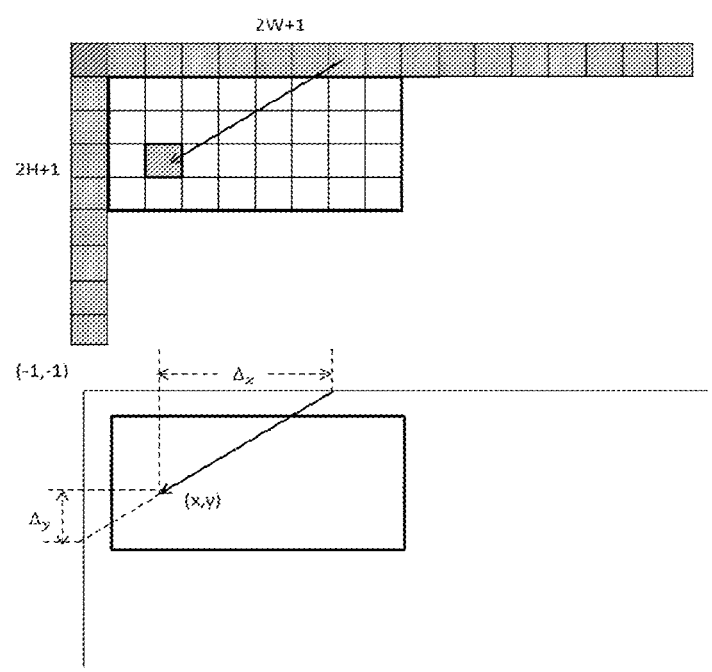
FIG. 8 shows an example derivation of the angle parameter A for a vertical direction beyond –135 deg.

FIG. 8 is an example of deriving the angle parameter A for a vertical direction beyond −135 degrees. $\Delta_x$ is the horizontal displacement of the predictor for a target pixel at (x,y). If the prediction were in the opposite direction (which is horizontal), the predictor would have vertical displacement $\Delta_y$.

Using the similarity of triangles results in:

$$\frac{\Delta_x}{((1+x) \ll 5) + \Delta_x} = \frac{(1+y) \ll 5}{((1+y) \ll 5) + \Delta_y}$$

TABLE 1

Angle parameter A defined in JEM

| | | | | | | Mode index | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| A | 32 | 29 | 26 | 23 | 21 | 19 | 17 | 15 | 13 | 11 | 9 | 7 | 5 | 3 | 2 | 1 |

| | | | | | | Mode index | | | | | | | | | |
|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| A | 0 | −1 | −2 | −3 | −5 | −7 | −9 | −11 | −13 | −15 | −17 | −19 | −21 | −23 | −26 | −29 |

Vertical directions

| | | | | | | Mode index | | | | | | | | | |
|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| A | −32 | −29 | −26 | −23 | −21 | −19 | −17 | −15 | −13 | −11 | −9 | −7 | −5 | −3 | −2 | −1 | 0 |

| | | | | | | Mode index | | | | | | | | | |
|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 | 66 |
| A | 1 | 2 | 3 | 5 | 7 | 9 | 11 | 13 | 15 | 17 | 19 | 21 | 23 | 26 | 29 | 32 |

TABLE 2

Angle parameter of opposite angles corresponding to positive A values.

| A | 1 | 2 | 3 | 5 | 7 | 9 | 11 | 13 | 15 | 17 | 19 | 21 | 23 | 26 | 29 | 32 |
|---|---|---|---|---|---|---|---|---|---|---|---|---|---|---|---|---|
| $A_n$ | 1024 | 512 | 341 | 205 | 146 | 114 | 93 | 79 | 68 | 60 | 54 | 49 | 45 | 39 | 35 | 32 |

As used in JEM, here the calculation has used the fact that the distance between two nearest samples is (1<<5) using (1/32) sample resolution. Simplifying this results in:

$$\Delta_x \Delta_y = ((1+x)(1+y)) << 10)$$

The prediction angle is opposite to the horizontal direction having $\Delta_y=(1+x)A$ where A denotes the value of the angle parameter for the horizontal direction. Substituting in the above equation, results in:

$$\Delta_x A = ((1+y) << 10),$$

$$\text{or, } \Delta_x = (1+y)\frac{(1 << 10)}{A}.$$

Therefore, the angle parameter for the vertical direction is given as $$A_n = \frac{1 << 10}{A}$$

where A is the angle parameter of the opposite direction. Since A has only integral values, the above expression may result in fractional values for $A_n$. Therefore, rounding the value to the nearest integer:

$$A_n = \text{round}\left(\frac{1 << 10}{A}\right)$$

The same expression would be obtained if we had considered a horizontal direction beyond a 45-degree angle.

In that case, A would denote the angle parameter of the opposite vertical direction. Note that, irrespective of the BT block shape, if the block is rectangular, the newly introduced directions are exactly opposite to the directions removed (within the rounding). Therefore, the A parameter of the removed directions can be used to compute the A parameter of the newly introduced opposite direction. Both the removed directions and the newly introduced ones are always positive (either positive horizontal or positive vertical). Hence, they have positive A parameter values. Table 2 lists the positive A values in JEM, and the corresponding values of $A_n$ as computed above.

Using values from Table 2, the angle parameters for different flat block shapes are given below. The angle parameters for tall blocks can be derived in an analogous manner but are not shown here. Before specifying the tables, there are two points to note. First, as seen in the above table, JEM specifies the angles for discrete angular directions. Hence, the starting and ending directions might not be matching exactly with the secondary diagonal. Similarly, one direction might not be matching exactly with the diagonal direction. In this case, without changing the specified directions in JEM, the proposed method will take the nearest directions for this purpose. Secondly, in JEM, for a BT block, the ratio of the length of the larger side to the smaller side can have values 1, 2, 4, and 8 only. When the ratio equals 1, it is a square block, and in this case, the directions remain unchanged. Therefore, in the following are presented the A values for blocks vis-à-vis the mode number with W/H (width/height) equal to 2, 4, and 8 only. As the W/H value is increased, the number of horizontal directions is decreased, and the number of vertical directions is increased. Therefore, for W/H equal to 4, reuse the vertical directions from W/H equal 2, and for W/H equal to 8, reuse the vertical directions for W/H equal to 4. These are shown in bold typeface in tables. As per the convention, the diagonal mode in the vertical directions is included. It is to note that, for higher W/H ratios such as 16 and 32, which may be allowed in future changes in JEM or in any standard, a similar approach can be followed.

Case 1: W/H=2
modeShift=6
No. of horizontal directions (Left modes)=20
No. of vertical directions (Top modes)=2*6+33=45

Note that, in Table 3, the directions corresponding to modes 22-27 were already defined in JEM, where they were horizontal directions. Here they are grouped in vertical directions since the diagonal direction now corresponds to mode 22. The A parameter values had to be recalculated in terms of displacements along the top edge of the block.

Case 2: W/H=4
modeShift: 10
No. of horizontal directions (Left modes)=12
No. of vertical directions (Top modes)=2*4+45=53

TABLE 3

Angle parameter A for flat blocks with W/H equal to 2.

| Horizontal directions | | | | | | | | | | | | | | | | |
|---|---|---|---|---|---|---|---|---|---|---|---|---|---|---|---|---|
| Mode index | | | | | | | | | | | | | | | | |
| | 2 | 3 | 4 | 5 | 6 | 7 | 8 | 9 | 10 | 11 | 12 | 13 | 14 | 15 | 16 | 17 |
| A | 17 | 15 | 13 | 11 | 9 | 7 | 5 | 3 | 2 | 1 | 0 | −1 | −2 | −3 | −5 | −7 |

| Mode index | | | |
|---|---|---|---|
| 18 | 19 | 20 | 21 |
| A | | | |
| −9 | −11 | −13 | −15 |

TABLE 3-continued

Angle parameter A for flat blocks with W/H equal to 2.

Vertical directions

| Mode index | | | | | | | | | | | | |
|---|---|---|---|---|---|---|---|---|---|---|---|---|
| 22 | 23 | 24 | 25 | 26 | 27 | 28:60 | | 61 | 62 | 63 | 64 | 65 | 66 |

| A | −60 | −54 | −49 | −45 | −39 | −35 | −32:32 from Table 1. | 35 | 39 | 45 | 49 | 54 | 60 |

TABLE 4

Angle parameter A for flat blocks with W/H equal to 4.

Horizontal directions

| Mode index | | | | | | | | | | | |
|---|---|---|---|---|---|---|---|---|---|---|---|
| 2 | 3 | 4 | 5 | 6 | 7 | 8 | 9 | 10 | 11 | 12 | 13 |
| A | 9 | 7 | 5 | 3 | 2 | 1 | 0 | −1 | −2 | −3 | −5 | −7 |

Vertical directions

| Mode index | | | | | | | | |
|---|---|---|---|---|---|---|---|---|
| 14 | 15 | 16 | 17 | 18:62 | 63 | 64 | 65 | 66 |
| A | −114 | −93 | −79 | −68 | −60:60 from Table 3 | 68 | 79 | 93 | 114 |

Note that, in Table 4, the directions corresponding to modes 14-17 were already defined in JEM, where they were horizontal directions. Here, they have been grouped in vertical directions since the diagonal direction now corresponds to mode 14.

Case 3: W/H=8
modeShift: 12
No. of horizontal directions (Left modes)=8
No. of vertical directions (Top modes)=2*2+53=57

Note that, in Table 5, the directions corresponding to modes 10-11 were already defined in JEM, where they were horizontal directions. Here, they have been grouped in vertical directions since the diagonal direction now corresponds to mode 10.

As we see in the table, the mode index will always vary between 2-66 irrespective of block shape. However, for different blocks, the same mode index may correspond with different prediction directions. Therefore, to distinguish between them, it is proposed here to introduce a parameter called dirIndex which is defined as:

$$\text{dirIndex} = \text{modeIndex} + \text{modeShift} - 2 \qquad (1)$$

The dirIndex will correspond to only one prediction direction and vice versa. Table 6 shows the range of dirIndex for different target block shapes along with the modeShift values.

Figure 9A:
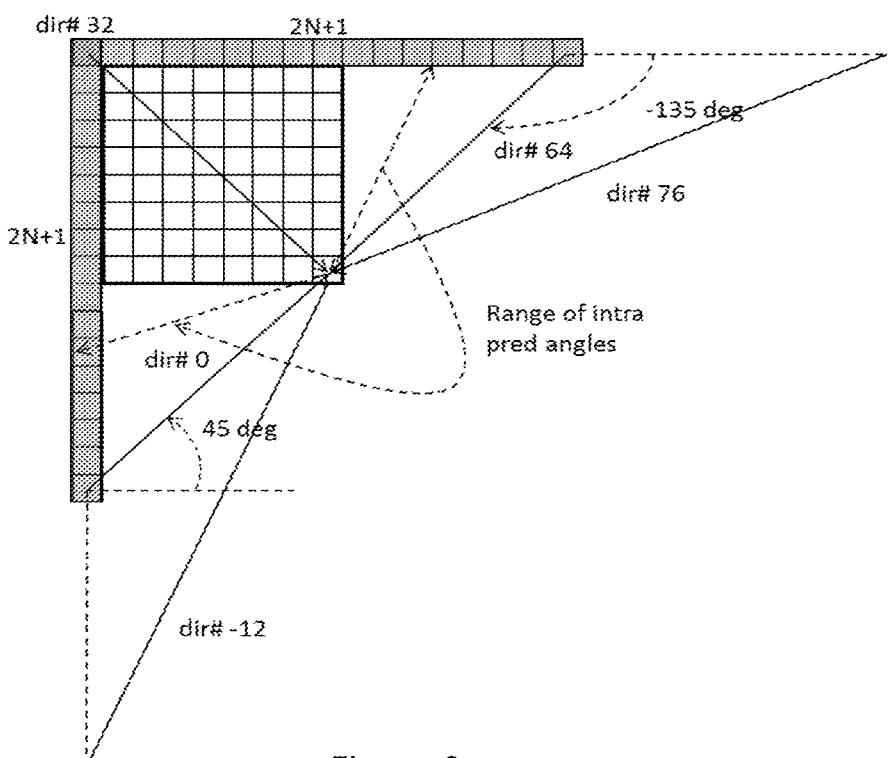
FIG. 9a shows dirIndex (shown as dir #) associated with different directions and FIG. 9b shows an example of reduced prediction directions.

FIG. 9a shows the prediction directions designated with the direction Indices (as dir #). There are 89 possible prediction directions in total spanning an angle greater than 180 degrees. Though the total number of directions is greater than 65, for any given target block, only 65 adjacent directions are checked for prediction. These 65 directions span 180 degrees along a line. The directions are adapted with the target block size, to check more or less number of directions in vertical or horizontal directions.

In the JEM definition of prediction directions, there is only one pair of directions (dir #0 and dir #64) where the directions are exactly opposite to each other. Notice that, now, there are a range of direction pairs which are exactly opposite. For any direction with

TABLE 5

Angle parameter A for flat blocks with W/H equal to 8.

Horizontal directions

| Mode index | | | | | | | | |
|---|---|---|---|---|---|---|---|---|
| 2 | 3 | 4 | 5 | 6 | 7 | 8 | 9 |
| A | 5 | 3 | 2 | 1 | 0 | −1 | −2 | −3 |

Vertical directions

| Mode index | | | | |
|---|---|---|---|---|
| 10 | 11 | 12:64 | 65 | 66 |
| A | −205 | −146 | −114:114 from Table 4 | 146 | 205 |

TABLE 6 modeShift and dirIndex for different block shapes

| W/H | Range of dirIndex | modeShift |
|---|---|---|
| 1 | 0:64 | 0 |
| 2 | 6:70 | 6 |
| 4 | 10:74 | 10 |
| 8 | 12:76 | 12 |
| 1/2 | −6:58 | −6 |
| 1/4 | −10:54 | −10 |
| 1/8 | −12:52 | −12 | index smaller than or equal to 0, or greater than or equal to 64, the opposite direction is included in the set of all possible directions. However, for any given target block, only the directions corresponding to mode 2 and mode 66 are opposite. The directions with dirIndex smaller than, or equal to, 0 correspond to the positive horizontal directions beyond 45-degree angle, which have positive A values. Similarly, the directions with dirIndex greater than, or equal to, 64 correspond to positive vertical directions beyond −135-degree angle, which have positive A values.

FIG. 9a shows dirIndex (shown as dir #) associated with different directions. For square blocks, the dirIndex varies from 0 to 64 corresponding to the 65 directions defined from 45 deg to −135 deg. For flat blocks, depending on the shape, dirIndex is greater than 64 for some vertical directions. Similarly, for tall blocks, depending on the shape, dirIndex is smaller than 0 for some horizontal directions.

Figure 9B:
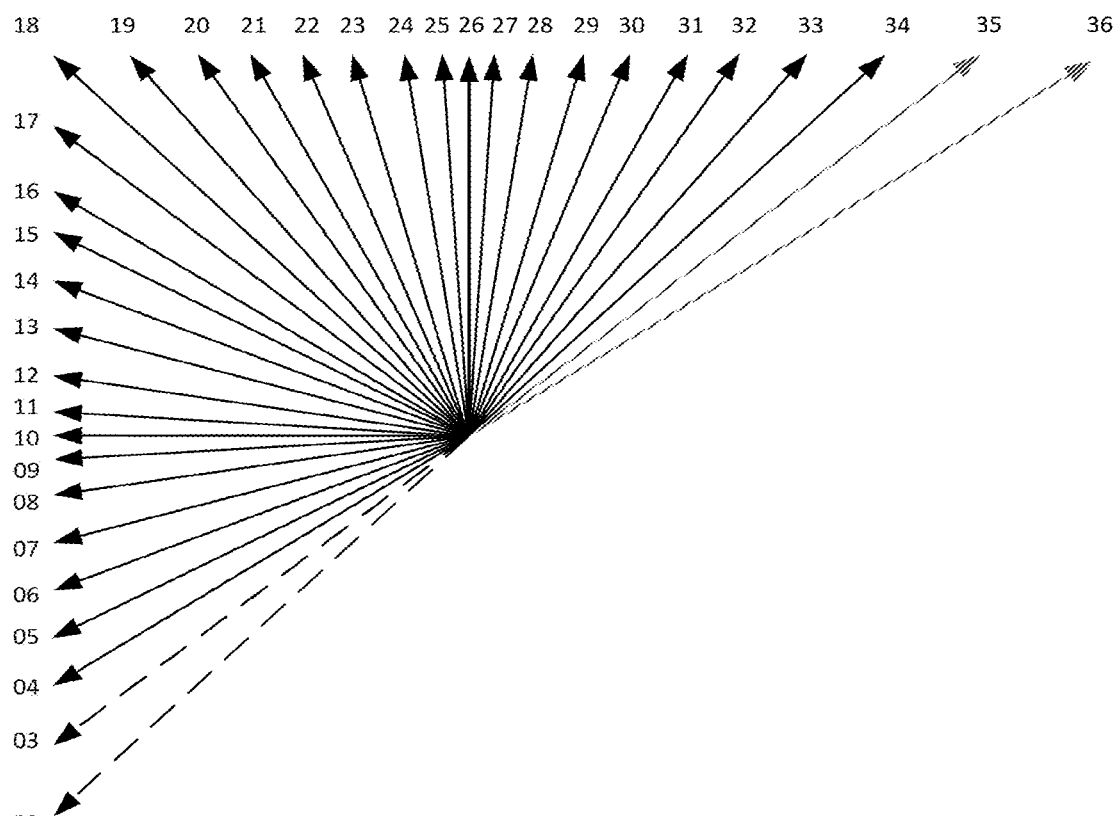

The number of directions can also be limited, or expanded, beyond the number presented above. Consider the hypothetical case of 33 HEVC directions in FIG. 9b and limiting the operation to two modes closest to the diagonal modes. In this case, if the block width is larger than its height, mode 2 and mode 3 would be removed horizontal modes. In addition, mode 3 and mode 4 would have extra flags indicating whether to use the conventional mode or flipped wide angular directions with newly created mode 35 and mode 36, the new vertical modes accounting for new prediction directions.

In the above definitions of angle parameter A, the diagonal direction has been changed according to the block shape. However, this is not a mandatory requirement. The change of the diagonal mode only converts some horizontal negative directions to vertical negative directions, or vice versa. The conversion makes the new directions as wide angles with new angle parameter $A_n$. These angles may not be identical to the original angles associated with the original negative directions before conversion, since there is a rounding involved in the derivation of the angle parameter $A_n$.

However, they will be very close. Therefore the change of the diagonal mode essentially does not add much to the performance gain. It is the wide angles in the positive directions (positive vertical for flat blocks, and positive horizontal for tall blocks), which are added to replace some existing positive directions (positive horizontal for flat blocks, and positive vertical for tall blocks) that are important. For all practical purposes, therefore, the original diagonal direction can be left unchanged. In Table 3, Table 4, and Table 5, this will move the involved modes from the vertical side to the horizontal side with their A values replaced by the old A values. This means that the last column of the horizontal modes will have A value equal to 29, and the first column of the vertical modes will have A value equal to −32, for all tables. Keeping the diagonal mode unchanged will also conform to the goal of adding new wide angle directions only beyond −135 degree for flat blocks, and beyond 45 degree for tall blocks. The tables for various W/H ratios are presented in Table 3-b, Table 4-b, and Table 5-b below.

TABLE 3-b

Angle parameter A for flat blocks with W/H = 2. ModeShift = 6, Number of horizontal directions = 32 − 6 = 26, Number of vertical directions = 6 + 33 = 39

Horizontal directions

| Mode index | | | | | | | | | | | | | | | | |
|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| A | 17 | 15 | 13 | 11 | 9 | 7 | 5 | 3 | 2 | 1 | 0 | −1 | −2 | −3 | −5 | −7 |

| Mode index | | | | | | | | | | |
|---|---|---|---|---|---|---|---|---|---|---|
| | 18 | 19 | 20 | 21 | 22 | 23 | 24 | 25 | 26 | 27 |
| A | −9 | −11 | −13 | −15 | −17 | −19 | −21 | −23 | −26 | −29 |

Vertical directions

| Mode index | | | | | | |
|---|---|---|---|---|---|---|
| | 28:60 | 61 | 62 | 63 | 64 | 65 | 66 |
| A | −32:32 from Table 1. | 35 | 39 | 45 | 49 | 54 | 60 |

TABLE 4-b

Angle parameter A for flat blocks with W/H = 4. ModeShift = 10, No. of horizontal directions = 32 − 10 = 22, No. of vertical directions = 10 + 33 = 43.

Horizontal directions

| Mode index | | | | | | | | | | | | | | | | |
|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| A | 9 | 7 | 5 | 3 | 2 | 1 | 0 | −1 | −2 | −3 | −5 | −7 | −9 | −11 | −13 | −15 |

| Mode index | | | | | | |
|---|---|---|---|---|---|---|
| | 18 | 19 | 20 | 21 | 22 | 23 |
| A | −17 | −19 | −21 | −23 | −26 | −29 |

TABLE 4-b-continued

Angle parameter A for flat blocks with W/H = 4. ModeShift = 10, No. of horizontal directions = 32 − 10 = 22, No. of vertical directions = 10 + 33 = 43.

| | Vertical directions | | | |
|---|---|---|---|---|
| | Mode index | | | |
| | 24:62 | 63 | 64 | 65 | 66 |
| A | −32:60 from Table 3-b | 68 | 79 | 93 | 114 |

TABLE 5-b

Angle parameter A for flat blocks with W/H = 8. ModeShift = 12, No. of horizontal directions = 32 − 12 = 20, No. of vertical directions = 12 + 33 = 45

| | Horizontal directions | | | | | | | | | | | | | | | |
|---|---|---|---|---|---|---|---|---|---|---|---|---|---|---|---|---|
| | Mode index | | | | | | | | | | | | | | | |
| | 2 | 3 | 4 | 5 | 6 | 7 | 8 | 9 | 10 | 11 | 12 | 13 | 14 | 15 | 16 | 17 |
| A | 5 | 3 | 2 | 1 | 0 | −1 | −2 | −3 | −5 | −7 | −9 | −11 | −13 | −15 | −17 | −19 |

| | Mode index | | | |
|---|---|---|---|---|
| | 18 | 19 | 20 | 21 |
| A | −21 | −23 | −26 | −29 |

| | Vertical directions | | |
|---|---|---|---|
| | Mode index | | |
| | 22:64 | 65 | 66 |
| A | −32:114 from Table 4-b | 146 | 205 |

To support the new prediction directions, the lengths of the reference arrays need to be adjusted. As it has been mentioned earlier, with the proposed prediction method, the length of the top reference array is 2*W+1 and the length of the left reference array is 2*H+1 where W and H denote the width and height of a target block. However, because the defined directions for different block shapes do not match with the block shape in the exact manner, it is needed to extend the shorter reference array by a few more samples. The longer reference array size is sufficient to support the defined directions in its side. This is explained below.

Consider first the case when W>H. Referring to Table 3, Table 4, and Table 5, it is noted that the angle parameter A corresponding to mode Index 2 is equal to ((H*32)/W)+1. Thus, for W/H equal to 2, 4, and 8, the angle parameter A is equal to 17, 9, and 5 respectively. For a given value of A, the portion of the reference array to support the prediction for W samples along any row is equal to (A*W+31)>>5. Applying this to the last row of a target block, with the above angles, it is required to have 1+H+((A*W+31)>>5) reference samples on the left reference array. Therefore the required extension on the left reference array is given as $H\_Ext = 1 + H + ((A*W+31) >> 5) − (1 + 2*H) = ((A*W + 31) >> 5) − H.$ Substituting the value of A corresponding to mode 2, the above expression can be simplified as:

$H\_Ext = (W+31) >> 5$

H_Ext values for different block sizes are given below. Here the maximum block size of 128 is assumed, as used in JEM. Also, it is assumed that the maximum value of (W/H) is equal to 8.

| 4 × 8: H_Ext = 1 | 8 × 16: H_Ext = 1 | 16 × 32: H_Ext = 1 | 32 × 64: H_Ext = 2 |
| 4 × 16: H_Ext = 1 | 8 × 32: H_Ext = 1 | 16 × 64: H_Ext = 2 | 32 × 128: H_Ext = 4 |
| 4 × 32: H_Ext = 1 | 8 × 64: H_Ext = 2 | 16 × 128: H_Ext = 4 | 64 × 128: H_Ext = 4 |

When H>W, the top reference needs to be extended by a few samples. The number of samples can be deduced in an analogous manner:

$$W\_Ext = 1 + W + ((A*H+31) >> 5) - (1+2*W) = ((A*H+31) >> 5) - W \quad (5)$$

Because of the symmetry of the angle parameter A, the values of A here are identical to those for the case W>H. The angle parameter corresponding to the mode index 66 will be equal to $((W*32)/H+1$. Using this value, the above expression can be simplified as:

$$W\_Ext = (H+31) >> 5.$$

W_Ext values for different block sizes are given below. Here the maximum block size of 128 is assumed, as used in JEM. Also, it is assumed that the maximum value of (H/W) is equal to 8.

| | | | |
|---|---|---|---|
| 8 × 4: W_Ext = 1 | 16 × 8: W_Ext = 1 | 32 × 16: W_Ext = 1 | 64 × 32: W_Ext = 2 |
| 16 × 4: W_Ext = 1 | 32 × 8: W_Ext = 1 | 64 × 16: W_Ext = 2 | 128 × 32: W_Ext = 4 |
| 32 × 4: W_Ext = 1 | 64 × 8: W_Ext = 2 | 128 × 16: W_Ext = 4 | 128 × 64: W_Ext = 4 |

The extension values H_Ext and W_Ext can be calculated in the same manner for higher width to height, or height to width, ratios.

The above extensions are the minimum number of additional samples required on the shorter reference array. However, for the advantage of implementation, it may be preferable to take additional number of reference samples than the minimum necessary to support all prediction angles. In the following we provide several variations.

In one variation, the number of samples on the top or the left reference array is equal to $2*\max(W,H)+1$, where $\max(W,H)=W$ if $W>=H$ else $\max(W,H)=H$.

In another variation, the number of samples on the top reference array is $W+\max(W,H)+1$ and the number of samples on the left reference array is equal to $H+\max(W,H)+1$.

The number of samples on the longer reference array is sufficient, but not always necessary. In some cases, there are some redundant samples longer reference array, which are not used for any prediction mode. Therefore, it is possible to, reduce the number of reference samples on the longer side. In another variation, if W>H, the number of samples on the left reference is equal to $(2*H+1+d\_h)$ and the number of samples on the top reference array is equal to $(2*W+1-d\_h)$ where the parameter d depends on the block size. For example, if W=8 and H=4, d_h=0, else d_h=H_ext. If H>W, the number of samples on the left reference is equal to $(2*H+1-d\_w)$ and the number of samples on the top reference array is equal to $(2*W+1+d\_w)$ where the parameter d_w depends on the block size. For example, if H=8 and W=4, d_w=0, else d_w=W_ext. This variation has the advantage that the total number of samples on both reference arrays (without the duplication of the top left sample) remain about $2*W+2*H+1$, which equal the total number of reference samples for a square target block.

In the case when the number of wide angles is limited to a certain maximum value due to hardware or system constraints, the required number of additional samples can be calculated exactly in the same manner as given above using the angle parameter corresponding to the mode index 2, if W>H, or mode index 66, if H>W. In "CE3-related: Wide angle intra prediction for non-square blocks, JVET-K0500, Ljubljana, SI, 10-18 Jul. 2018", the maximum number of wide angles is 10, which correspond to W/H=4 or H/W=4. For higher values of W/H (or H/W) the number of wide angles is still 10 and they are exactly the same as those for W/H=4 (or H/W=4). Because of this restriction, the total number of additional reference samples required on the shorter reference side as extension can be more than just 4 samples.

For example, for a 4×32 block, the number of additional samples is equal to 5 instead of 1. Similarly, blocks of size 4×64 and 4×128, which are allowed in JEM in random access configuration (having W/H=16 and 32 respectively), the number of additional samples are 14 and 32, instead of 2 and 4, respectively. In this case, the following variations are proposed.

In another variation, reference array lengths can be calculated as follows:

```
leftRefLength = (H << 1);
topRefLength = (W << 1);
If W > H
    leftRefLength += 4 if W/H <= 4;
    else
    leftRefLength += (W >> 2).
Else if H > W
    topRefLength += 4 if H/W <= 4;
    else
    topRefLength += (H >> 2).
```

In another variation, the reference array lengths can be calculated so that the total number of samples is about $1+2*W+2*H$:

```
leftRefLength = (H << 1);
topRefLength = (W << 1);
If W > H
    Ext = 4 if W/H <= 4
        = (W >> 2) otherwise.
    leftRefLength += Ext
    topRefLength -= ((Ext >> 3) << 3).
Else if H > W
    Ext = 4 if H/W <= 4
        = (H >> 2) otherwise.
    topRefLength += Ext;
    leftRefLength -= ((Ext >> 3) << 3).
```

It is to note that an extension of 4 pixels is used in above variations to account for all possible block sizes up to 64×128 or 128×64. Smaller values such as 1, or 2 can be used if the maximum block size is restricted due to system or hardware constraints. The following variations use the exact minimum number of required samples on the shorter reference side.

Note that the operations in the pseudo code are integer operations, for example, W/H can be equal to 1, 2, 4, 8, 16, 32 . . . only (i.e., no fractional number). In one variation, reference array lengths can be calculated as follows:

```
leftRefLength = (H << 1);
topRefLength = (W << 1);
If W > H
    leftRefLength += (max(9,A) * W + 31) >> 5) – H;
    where A = (32 * H)/W + 1.
Else if H > W
    topRefLength += (max(9,A) * H + 31) >> 5) – W;
    where A = (32 * W)/H + 1
```

In the above variation the length of the longer reference array is not changed. In another variation, reference array lengths can be calculated as follows:

```
leftRefLength = (H << 1);
topRefLength = (W << 1);
If W > H
    Ext = (max(9,A) * W + 31) >> 5) – H,
    where A = (32 * H)/W + 1.
    leftRefLength += Ext;
    topRefLength –= ((Ext >> 1) << 1).
Else if H > W
    Ext = (max(9,A) * H + 31) >> 5) – W,
    where A = (32 * W)/H + 1.
    topRefLength += Ext;
    leftRefLength –= ((Ext >> 1) << 1).
```

When the maximum number of wide angles is restricted as above, H_Ext if W>H, or W_Ext if H>W, can be expressed in simplified form as:

If $W>H$, $H\_Ext=\max(0,((W>>2)-H))+((W+31)>>5)$;

Else, if $H>W$, $W\_Ext=\max(0,((H>>2)-W))+((H+31)>>5)$

They can be equivalently expressed as:

If $W>H$, $H\_Ext=((W>>\text{blockShapeRatio})-H)+((W+31)>>5)$;

else, if $H>W$, $W\_Ext=((H>>\text{blockShapeRatio})-W))+((H+31)>>5)$ where, $\text{blockShapeRatio}=\min(2,\text{abs}(\log 2(W)-\log 2(H)))$.

Using these simplified expressions, the two variations given above can be equivalently expressed as follows: In one variation, when only the shorter reference array is extended:

```
leftRefLength = (H << 1);
topRefLength = (W << 1);
If W > H
    leftRefLength += ((W>>blockShapeRatio) – H) + ((W + 31) >> 5
Else if H > W
    topRefLength += ((H>>blockShapeRatio) – W)) + ((H + 31) >> 5)
```

In the other variation, the length of the longer reference is also changed so that the total number of reference samples is about 1+2*W+2*H.

```
leftRefLength = (H << 1);
topRefLength = (W << 1);
If W > H
    Ext = ((W>>blockShapeRatio) – H) + ((W + 31) >> 5)
    leftRefLength += Ext;
    topRefLength –= ((Ext >> 1) << 1).
Else if H > W
    Ext = ((H>>blockShapeRatio) – W)) + ((H + 31) >> 5)
    topRefLength += Ext;
    leftRefLength –= ((Ext >> 1) << 1).
```

To encode the prediction mode for luminance, the concept of most probable mode (MPM) is maintained in JVET. Using the prediction modes of causal neighbor blocks (if they are available and intra-predicted), planar and DC prediction modes, and some fixed angular modes such as directly vertical, directly horizontal, mode 2, mode 66 and mode 34, an MPM set of 6 modes is constructed. The remaining prediction modes are partitioned into a selected set of 16 modes and a set of 45 remaining modes. If the prediction mode of the target block belongs to the MPM set, it is encoded with the index of the member MPM. If it belongs to the selected set, it is encoded with 4 bits. Otherwise it is encoded with a truncated binary code.

The proposed modification of prediction directions for rectangular BT blocks maintains the same coding scheme as in JEM with some changes. The causal neighbors of the target block can have different shapes. Therefore, they may have different prediction direction ranges. Furthermore, they may have same prediction modes even though those are associated with different prediction directions. This will pose a problem in the construction of the MPM set. Therefore, in the first step, the prediction modes of the neighbor blocks are mapped to the prediction mode of the target block through the prediction direction index (dirIndex).

Secondly, for a given target block, the dirIndex can have only 65 adjacent directions plus PLANAR and DC modes. If the prediction mode of the neighbor block is 0 (PLANAR) or 1 (DC), there is no mapping to be done, and the modes are checked for inclusion in the MPM set. If the mode is greater than 1, the mode is mapped to the corresponding direction index. If the direction index belongs to the range of 65 directions for the target block, then the corresponding mode number for the target block is checked for inclusion in the MPM set. Otherwise, the mode corresponding to the opposite direction is checked for inclusion in the MPM set. Note that, if a direction does not belong to the target block's direction set, the corresponding wide angle direction must belong to the set.

The mapping of the mode to a direction is done using Equation 1. Then, given the direction, the mapping to the mode of the target block is done using the following equation:

$$\text{modeIndex}=\text{dirIndex}-\text{modeShift}+2 \qquad (2)$$

where the modeShift of the target block is used. Using the dirIndex from Equation 1, results in:

$$\text{modeIndex}_{TB}=\text{modeIndex}_{NB}+\text{modeShift}_{NB}-\text{modeShift}_{TB} \qquad (3)$$

where the subscripts TB and NB are used to indicate the target block and the neighbor block, respectively. If the resulting $\text{modeIndex}_{TB}$ is less than 0 or greater than 66, it implies that the direction associated with the neighbor block's mode does not belong to the set of prediction directions for the target block. In this case, the associated wide angle direction is used. If $\text{modeIndex}_{TB}<0$, add 67 to it, or if modeIndex$_{TB}$>66, subtract 65 from it. The resulting mode is associated with the associated wide angle direction.

Two examples to clarify the above mapping are shown below.

Example 1: The target block has W=8 and H=8. Its left neighbor has W=8 and H=4, and prediction mode m=2.

Since W/H=2, the modeShift for the left neighbor is 6. The target block is a square and its modeShift is 0. Thus, the new modeIndex is obtained as m=2+6−0=8.

Example 2: The target block has W=4 and H=32. Its left neighbor has W=16 and H=4, and prediction mode m=8.

Since W/H=16/4=4, the modeShift for the left neighbor is 10. For the target block, W/H=4/32=1/8. Its modeShift is −12 and the direction indices range from −12 to 52. Thus, the new modeIndex is obtained as m=8+10−(−12)=30.

The rest of the mode coding process remains unchanged. Apart from the six modes in the MPM set, the remaining modes are divided into a selected set of 16 modes and a set consisting of the remaining 45 modes.

Note that, even if the target block is a square, the mapping is necessary for constructing the MPM set with the prediction modes of neighbor blocks, which may not be all square.

It is to note that even if the number of MPMs is changed, as long as the prediction modes of the neighbors are mapped to the prediction mode set of the target block, the employed prediction mode coding algorithm will remain unchanged.

For the Chroma CUs, at least one embodiment also does the same remapping of prediction modes to obtain the direct modes in the case where Luma and Chroma component trees are separate (i.e. in I-slices). The prediction modes of collocated and neighbor Luma CUs, can be remapped to the modes of the target Chroma block.

An alternative method that avoids the mode mapping for intra mode coding is to maintain the original modes and their associated directions. This is done by giving new mode indices to the new directions, which can be termed as wide angle directions (i.e., directions beyond −135 degree or 45 degree). So the wide angle directions beyond mode 66, for example, is given the mode indices 67, 68, and so on. Similarly, the wide angle directions beyond mode 2 are given mode indices −1, −2, etc (since mode 0 and 1 are already associated with the PLANAR and DC modes). This is similar to the dirIndex given earlier and does not require the modeShift. In this case, there is a one-to-one mapping between the dirIndex and the modeIndex as follows:

modeIndex=dirIndex+2 if dirIndex>=0 modeIndex=dirIndex if dirIndex<0

The modeIndex range values for different block shapes are shown in Table 7. As it is seen, for the given block shape values, the maximum value of the modeIndex is 78 and the minimum value is −12. It is to note here that, if the number of maximum directions is limited to certain value because of hardware or system constraints, the range of modeIndex values can be decided accordingly, For example, if the number of added directions beyond −135 degrees or beyond 45 degrees is limited to be 10, as proposed in "CE3-related: Wide angle intra prediction for non-square blocks, JVET-K0500, Ljubljana, SI, 10-18 Jul. 2018" then the range of dirIndex and modeIndex for W/H=8 and 1/8 cases are identical to that of W/H=4 and W/H=1/4 respectively.

TABLE 7

Range of modeIndex value for different block shapes

| W/H | Range of dirIndex | Range of modeIndex |
|---|---|---|
| 1 | 0:64 | 2:66 |
| 2 | 6:70 | 8:72 |
| 4 | 10:74 | 12:76 |
| 8 | 12:76 | 14:78 |
| 1/2 | −6:58 | −6:−1, 2:60 |
| 1/4 | −10:54 | −10:−1, 2:56 |
| 1/8 | −12:52 | −12:−1, 2:54 |

Since the dirIndex and modeIndex have one-to-one correspondence one can now work only with the modeIndex.

Since the wide angle directions added correspond to some original directions which are removed, there is also a one-to-one correspondence between their modeIndex values as well. To be general, let origMode and waMode denote the original modeIndex of the block, and the modeIndex with wide angles, respectively. Since the modeIndex values 0 (PLANAR mode) and 1 (DC mode) do not correspond to angular modes, we will not consider them here. The values of waMode are obtained from the origMode values as follows:

If W > H and origMode < 2 + modeShift,
    waMode = origMode + 65
Else, if H > W, and origMode > 66 − modeShift,
    waMode = origMode − 67
else
    waMode = origMode Since the angle parameter A (intraPredAngle in JEM code) and the modeShift are related, the above mapping can also be equivalently done as follows:

If W > H and intraPredAngle > (( 32 * H/W) + 1) and origMode < 34
    waMode = origMode + 65
Else, if H >W and intraPredAngle > (( 32 * W/H ) + 1) and origMode > 34
    waMode = origMode − 67
else
    waMode = origMode The above wide angle mapping makes sure that every mode removed is replaced by a mode close to the opposite direction. For example, for a flat block with W/H>1, the mode 2 is replaced by mode 67. Mode 67 is the nearest wide angle direction to the opposite direction of mode 2, which is mode 66. Those modes which are not removed are continued with the same modeIndex values after the mapping.

When the number of wide angles is restricted to be 10 as in "CE3-related: Wide angle intra prediction for non-square blocks, JVET-K0500, Ljubljana, SI, 10-18 Jul. 2018", the mapping can be obtained as:

If W > H and origMode < 2 + min(10, modeShift),
    waMode = origMode + 65
Else, if H > W and origMode > 66 − min(10, modeShift),
    waMode = origMode − 67
else
    waMode = origMode Or equivalently, as:

```
If W > H and intraPredAngle > max (9, (( 32 * H/W ) + 1)) and
origMode < 34
    waMode = origMode + 65
Else, if H > W, and intraPredAngle > max(9, (( 32 * W/H ) + 1)) and
origMode > 34
    waMode = origMode - 67
else
    waMode = origMode
```

This can also be equivalently given as:

```
blockShapeRatio = min(2, abs(log2(W) - log2(H)));
If W > H, and origMode < 2 + ((blockShapeRatio << 2) + 2)
    waMode = origMode + 65
else if H > W and origMode < 66 - ((blockShapeRatio << 2) + 2)
    waMode = origMode - 67
else
    waMode = origMode
```

The above mapping also makes sure that for 65 original angular modes, there are 65 unique angular modes after the above wide angle mapping. Note that this is not the only unique mapping and there are various other mappings possible between the set of removed directions and the set of added wide angle directions. But the above mapping makes the added wide angle mode close to the opposite direction of the removed mode.

The above method indirectly helps avoid the mapping of mode Indices of neighbor blocks during intra mode coding, as explained previously. The mapping of original mode indices to wide angle mode indices will be done at the prediction step only. Intra mode coding, which follows the prediction step at the encoder, will use the original mode indices instead of the wide angle mode indices. Similarly, at the decoder, intra mode decoding, which precedes the prediction step, will use the original mode indices, but the mapping to the wide angle mode index will be done at the prediction step.

The present techniques have considered the rectangular block shapes with width to height ratio in the range [1/8, 8]. However, it is to note that the principle can be extended to larger range of width to height ratio in a very straightforward manner. Table 8 includes the modeIndex values for higher values of block shape ratio. In this case, there are 14 wide angle directions beyond −135 degrees or 45 degrees. Here, the number of added wide angle directions is further increased corresponding to larger vales of W/H or (H/W). However, the mapping from origMode to waMode, as given earlier, still applies.

TABLE 8 modeShift values for all block sizes upto 4 × 128 or 128 × 4 with maximum width or height set to 128.

| W/H | dirIndex | modeShift |
|---|---|---|
| 1 | 0-64 | 0 |
| 2 | 6-70 | 6 |
| 4 | 10-74 | 10 |
| 8 | 12-76 | 12 |
| 16 | 13:77 | 13 |
| 32 | 14:78 | 14 |
| 1/2 | −6:58 | −6 |
| 1/4 | −10:54 | −10 |

TABLE 8-continued modeShift values for all block sizes upto 4 × 128 or 128 × 4 with maximum width or height set to 128.

| W/H | dirIndex | modeShift |
|---|---|---|
| 1/8 | −12:52 | −12 |
| 1/16 | −13:51 | −13 |
| 1/32 | −14:50 | −14 |

Based on the proposed direction definition, several embodiments are presented as possible implementation options. These can be implemented in JEM, for example.

In a first exemplary embodiment, called Embodiment 1, the angular prediction directions for target blocks are modified to include wide angle directions. If a target block is square, there is no change in the prediction directions. For a given prediction mode, the encoder and decoder perform the prediction in the existing manner. On the other hand, if the target block is rectangular, an angular prediction mode is first mapped to the wide angle mode using the modeShift value corresponding to the target block shape, as given earlier. The encoder and the decoder perform the prediction along the direction corresponding to the wide angle mode. The mapping to the wide angle mode happens only at the prediction stage. Intra mode coding at the encoder and intra mode decoding at the decoder remain unchanged. The encoder performs the best prediction mode search in the usual manner with RD (rate distortion) optimization and encodes the original mode index value using an MPM set consisting of original mode indices. Likewise, the decoder decodes the original mode index value using an MPM set consisting of original mode indices.

In a second exemplary embodiment, called Embodiment 2, the angular prediction directions for target blocks are modified as presented earlier. If the target block is a square, there is no change in the prediction directions. Else, if the target block is rectangular, the prediction modes are associated with defined directions depending on the aspect ratio of the block. The encoder performs the best prediction mode search in the usual manner with RD (rate distortion) optimization except that, for modes 2 to 66, the associated prediction directions depend on the block shape.

For Luma target blocks, the encoder encodes the prediction mode using an MPM set where the MPM set is constructed with mapping of the neighbor blocks' prediction modes, as explained in the previous section. For Chroma target blocks, it derives the direct modes by mapping the prediction modes of collocated and neighbor Luma blocks. This mapping is not necessary for blocks in Inter coded slices where the Luma and Chroma components have the same coding tree structure.

The decoder, for Luma target blocks, decodes the prediction mode with an MPM set, which it constructs in the same manner that the encoder does. For Chroma target blocks, it derives the direct modes after mapping the prediction modes of collocated and neighbor Luma blocks exactly in the same manner as the encoder does. It constructs the prediction for the target block in the usual manner except that, for modes 2 to 66, the associated prediction directions depend on the block shape.

Figure 10:
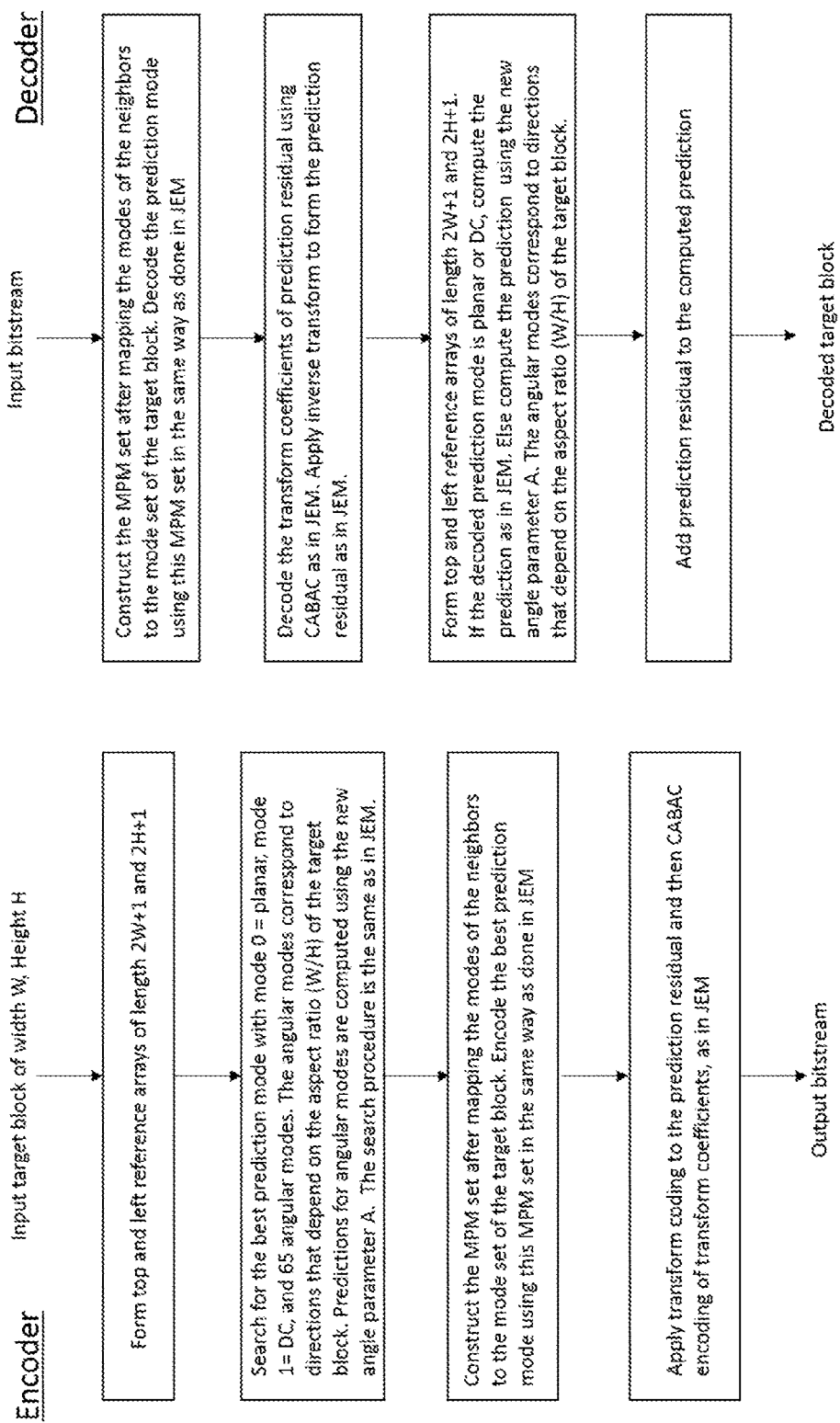
FIG. 10 shows encoder and decoder flow graphs for LUMA blocks in Embodiment 1.

FIG. 10 shows an encoder and decoder flow diagram for the Luma blocks in Embodiment 1.

In Embodiment 3, Embodiment 2 is augmented as far as the prediction directions are concerned. For any target block, the prediction directions are defined as the union of the set of directions defined in JEM, (i.e., 65 directions from 45 deg to −135 deg in clockwise direction) and the set of directions defined in this proposal, which depends on the target block shape. Since the set of defined directions for any target block consists of a subset of the JEM directions and some newly introduced directions, the union of the two sets will consist of the set of 65 JEM directions plus the newly introduced directions depending on the block shape. The newly introduced directions are opposite of some of the positive directions in JEM direction set (which had been removed in the proposal). A flag of 1-bit, called modeFlag, is used to distinguish between these opposite pair of directions, the numbers of which vary depending on the block shape. Since the JEM directions are included, this embodiment also keeps the mode indexing the same as in JEM. That is, mode 2 will correspond to the 45-degree angle and mode 66 will correspond to the −135-degree angle. The modes also having opposite directions (except mode 2 and mode 66) will have their modeFlag value equal to 0. The opposite directions will use the same mode number but with the modeFlag value equal to 1. That is, the pair of opposite directions will be associated with the same mode number, but with the modeFlag equal to 0 and 1, respectively.

The prediction mode encoding remains the same as in JEM. However, for the modes with opposite directions (except mode 2 and 66), the modeFlag is encoded with a fixed, mode-dependent, or neighbor-dependent context.

Note that, since the set of directions is an augmented set, the lengths of the top and left reference arrays also change. The length of the top reference array is H+W+1 or 2 W+1, whichever is greater. Similarly, the length of the left reference array is H+W+1 or 2H+1, whichever is greater. This means that, for flat blocks, the top reference array will have 2 W+1 samples and the left reference array will have H+W+1 samples. Similarly, for tall blocks, the top reference array will have H+W+1 samples and the left reference array will have 2H+1 samples. If the block is square, both the top and left reference arrays will have H+W+1 (=2H+1=2 W+1, since W=H) samples, as in JEM.

At the decoder side, the prediction mode is decoded using the usual MPM based method. If the mode belongs to the set of directions which have opposite directions, the modeFlag value is also decoded. If the prediction mode is planar or DC, the decoder will compute the prediction as in JEM. Else, if the modeFlag has not been decoded, or if it has been decoded and its value is zero, then the decoder constructs the prediction in the corresponding direction as in JEM. Else, the decoder constructs the prediction in the opposite direction to the one associated with the decoded mode, with the new angle parameter A.

For the Chroma target blocks, the direct modes are computed in the same manner as in JEM irrespective of the modeFlag value (if the mode has an opposite direction) for the corresponding Luma blocks. Depending on the target block aspect ratio, if any direct mode has an opposite direction, then the encoder, while searching for the best prediction mode, also includes the opposite direction in the search. If such a mode is finally determined to be the best mode, the modeFlag of one bit is encoded depending on the best direction. At the decoder, the derivation of the direct modes, the decoding of prediction mode, and modeFlag (in case the mode has an opposite direction), is exactly the same as in the encoder.

Figure 11:
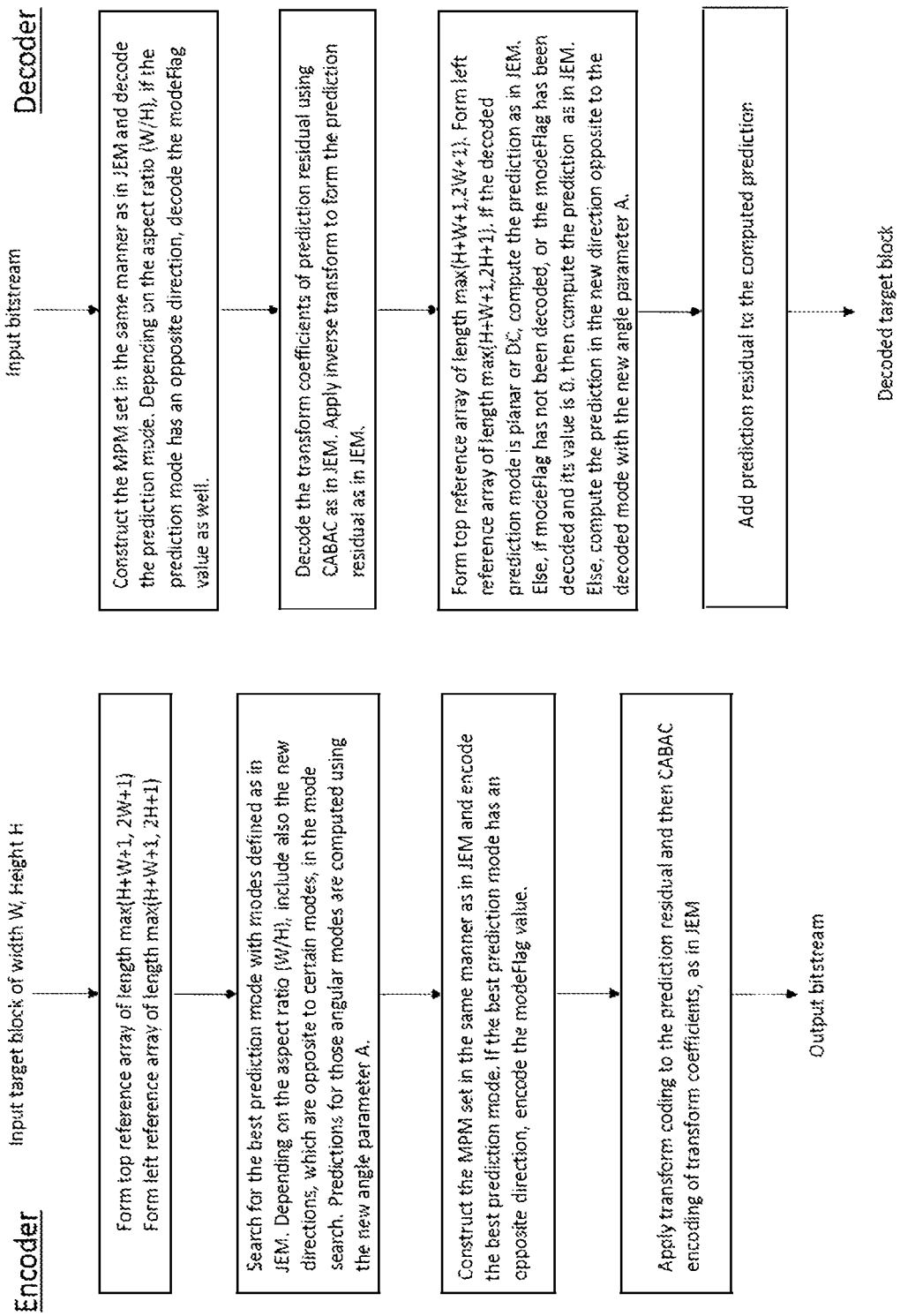
FIG. 11 shows encoder and decoder flowgraphs for LUMA blocks in embodiment 2.

The encoder and decoder flowgraphs for Luma blocks are shown in FIG. 11.

In a fourth exemplary embodiment, called Embodiment 4, the changes described in Embodiments 1-3 are applied only when the relevant reference samples are available. For example, in the case of a flat block, this invention extends the directions after −135°. However, independent of the current block shape, top right neighboring blocks may not be available. In that case, the target block will be predicted as in JEM, that is, using the 65 angular directions spanning from 45 degree to −135 degree in clock-wise direction. As both encoder and decoder can easily detect the presence of reconstructed neighboring blocks, they will decide, in a corresponding manner, whether to apply the extended directions.

In a fifth embodiment, Embodiment 5, all target blocks in a slice are predicted as in Embodiment 1 through Embodiment 4 and this is signaled to the decoder using a one bit flag in the slice header.

In a sixth embodiment, Embodiment 6, all target blocks in a frame are predicted as in Embodiment 1 through Embodiment 4 and this is signaled to the decoder using a one-bit flag in the Picture Parameter Set (PPS) header.

In a seventh embodiment, Embodiment 7, all target blocks in any frame of a sequence are predicted as in Embodiment 1 through Embodiment 4 and this is signaled to the decoder using a one-bit flag in the Sequence Parameter Set (SPS) header.

One advantage of the proposed embodiments is that they adapt the prediction directions for a rectangular block to the block shape. One aim is to improve the compression performance without increasing the complexity.

Figure 15:
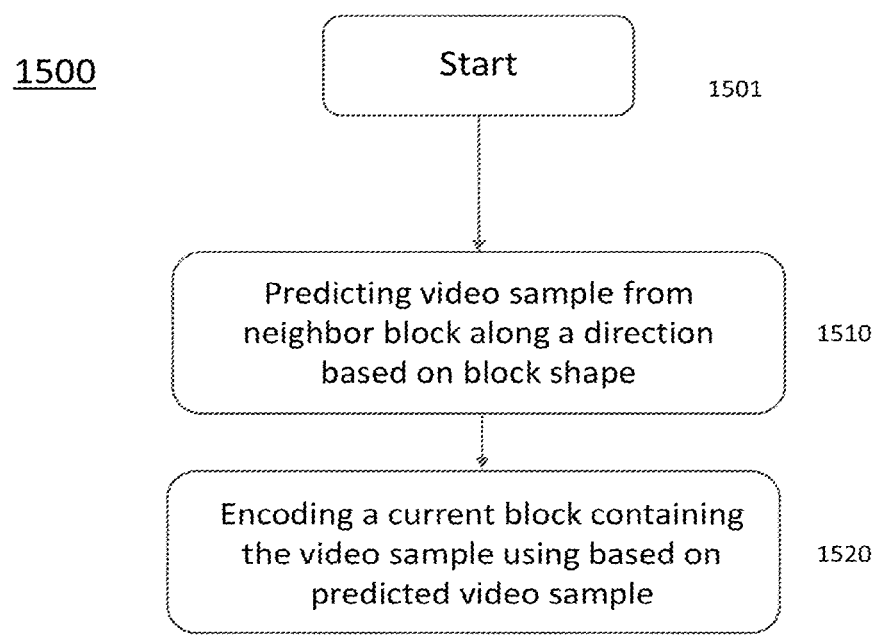
FIG. 15 shows one embodiment of a method for encoding under the general described aspects.

FIG. 15 shows one embodiment of a method 1500 for intra prediction with adaptive block sizes in an encoder. The method commences at Start block 1501 and control proceeds to block 1510 for predicting a video sample belonging to a rectangular block based on at least one sample of a neighboring block lying along a direction based on an aspect ratio of the rectangular block. Control proceeds from block 1510 to block 1520 for encoding the rectangular block using intra prediction based on the predicted video sample.

Figure 16:
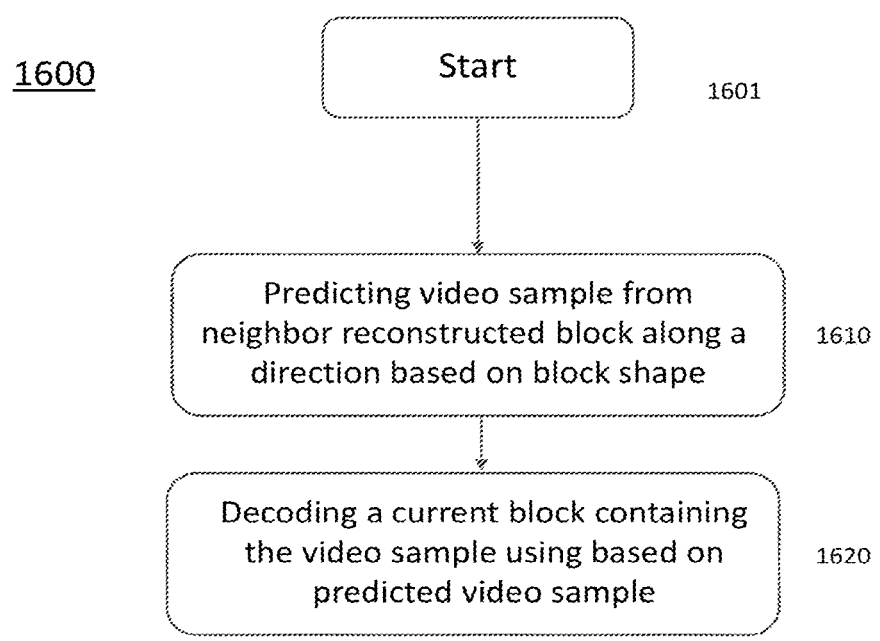
FIG. 16 shows one embodiment of a method for decoding under the general described aspects.

FIG. 16 shows one embodiment of a method 1600 for intra prediction with adaptive block sizes in an encoder. The method commences at Start block 1601 and control proceeds to block 1610 for predicting a video sample belonging to a rectangular block based on at least one sample of a neighboring reconstructed block lying along a direction based on an aspect ratio of the rectangular block. Control proceeds from block 1610 to block 1620 for decoding the rectangular block using intra prediction based on the predicted video sample.

Figure 17:
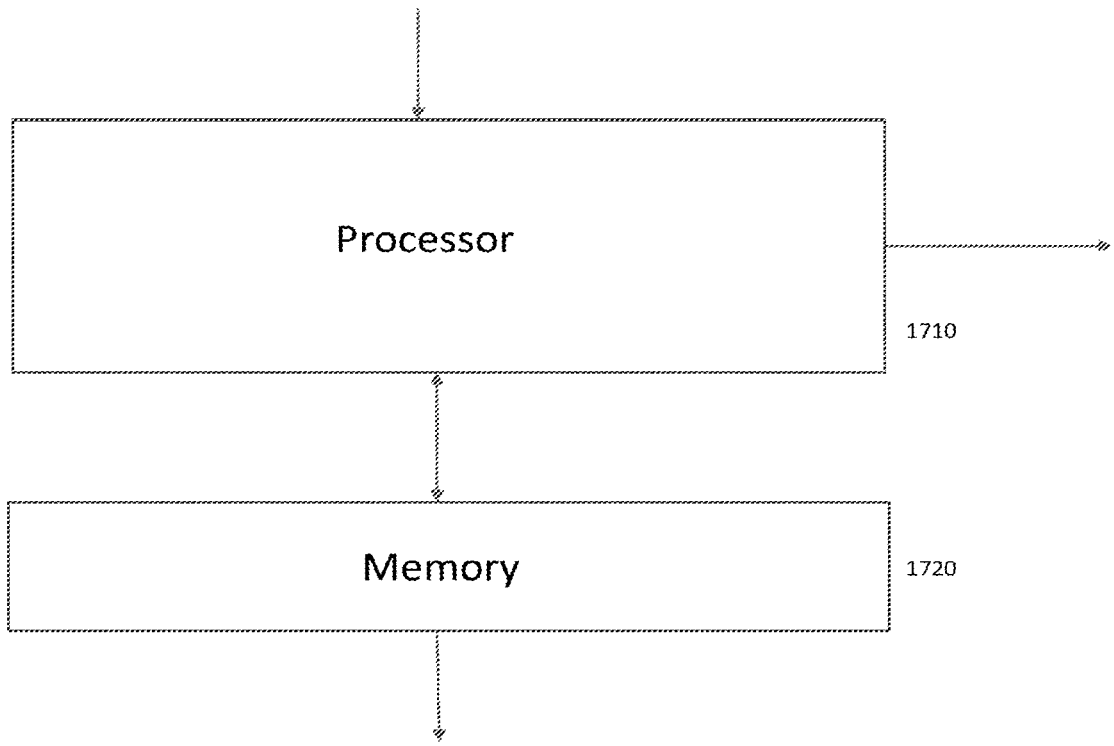
FIG. 17 shows one embodiment of an apparatus for encoding or decoding under the general described aspects.

FIG. 17 shows one embodiment of an apparatus 1700 for encoding or decoding a video block using intra prediction with adaptive block sizes. The apparatus comprises Processor 1710 having one or more input and output ports and is interconnected through one or more communication ports to Memory 1720. Apparatus 1700 is capable of performing either of the methods of FIG. 15 or FIG. 16 or any variant.

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 12:
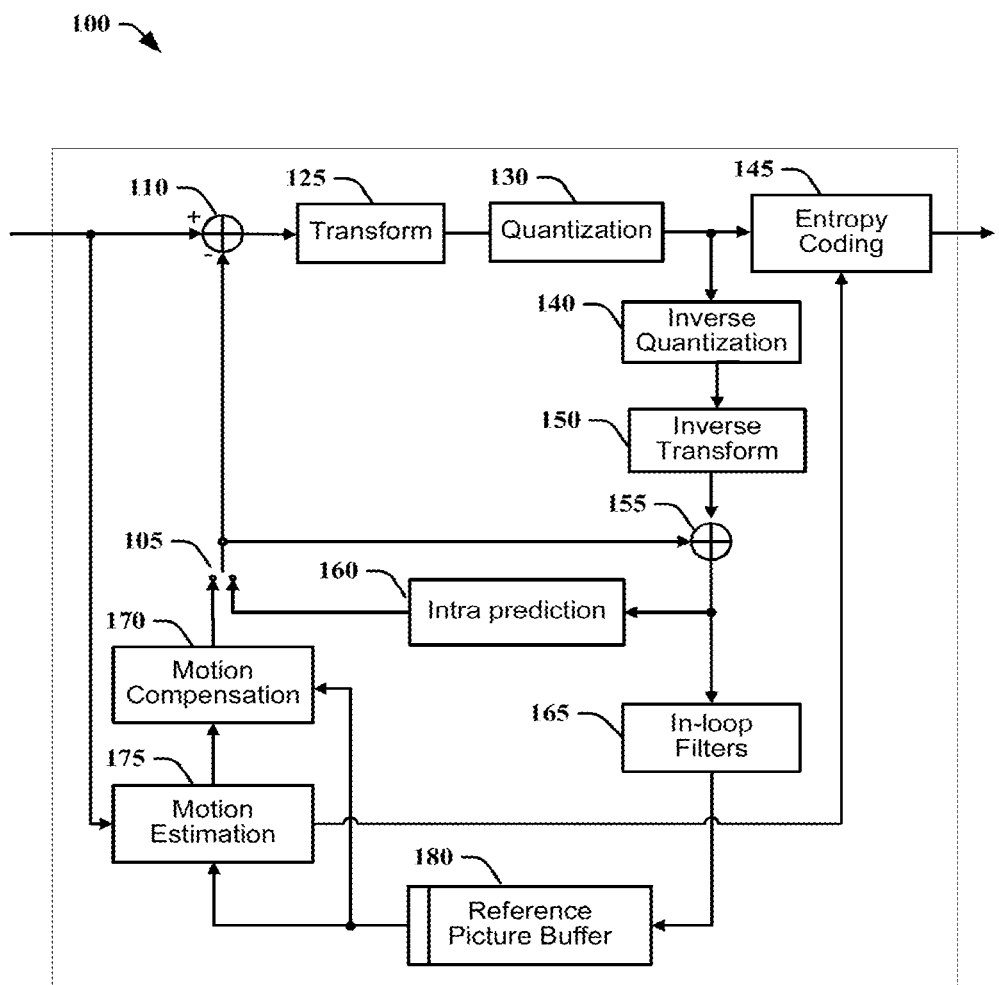
FIG. 12 shows a generic encoding embodiment to which the present embodiments can be applied.
Figure 13:
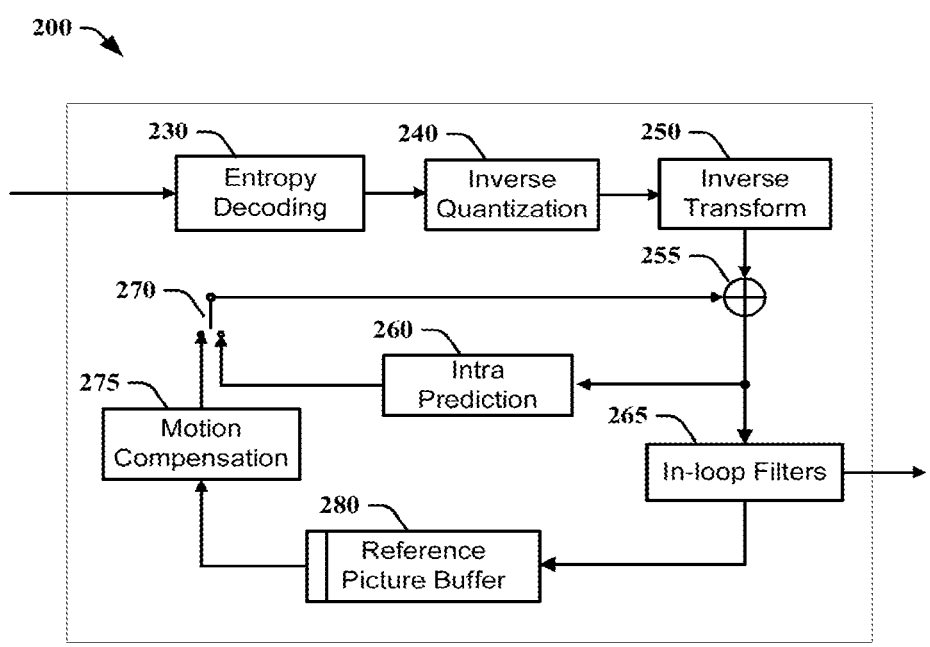
FIG. 13 shows a generic decoding embodiment to which the present embodiments can be applied.
Figure 14:
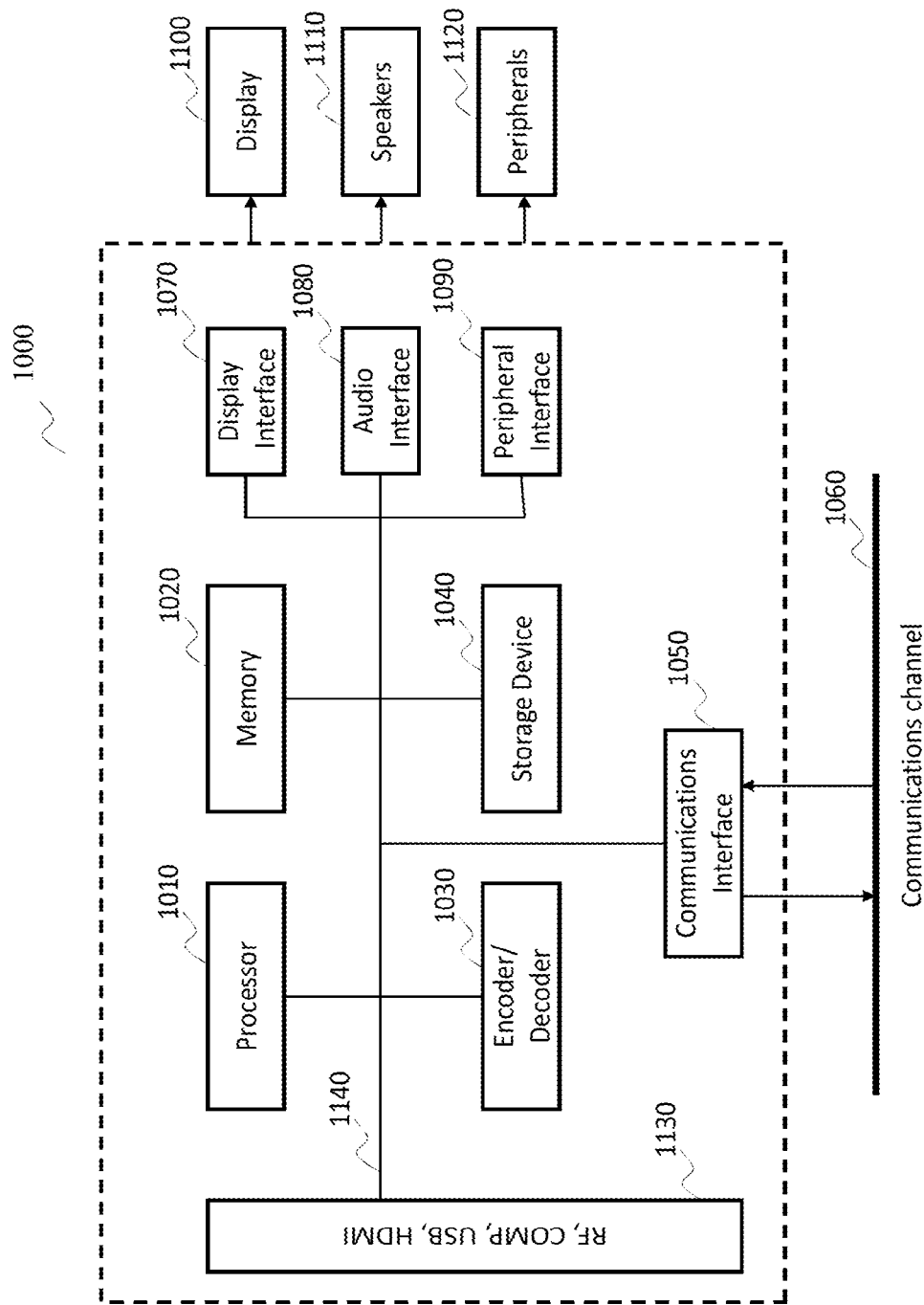
FIG. 14 shows a block diagram of an exemplary communications channel in which various aspects and exemplary embodiments are implemented.

The aspects described and contemplated in this document can be implemented in many different forms. FIGS. 12, 13 and 14 provide some embodiments, but other embodiments are contemplated and the discussion of FIGS. 12, 13 and 14 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described above, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, such as, for example, the motion compensation 170 and motion estimation 175 of FIG. 12 and motion estimation 275 of FIG. 13. Moreover, the present aspects are not limited to JVET or HEVC, and can be applied, for example, to other standards and recommendations, whether pre-existing or future-developed, and extensions of any such standards and recommendations (including JVET and HEVC). Unless indicated otherwise, or technically precluded, the aspects described in this document can be used individually or in combination.

Various numeric values may be shown in the present document. The specific values are for exemplary purposes and the aspects described are not limited to these specific values.

FIG. 12 illustrates an exemplary encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components to get a signal distribution more resilient to compression (for instance using a histogram equalization of one of the color components). Metadata can be associated with the pre-processing and attached to the bitstream.

In the exemplary encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 13 illustrates a block diagram of an exemplary video decoder 200. In the exemplary decoder 200, a bitstream is decoded by the decoder elements as described below. Video decoder 200 generally performs a decoding pass reciprocal to the encoding pass as described in FIG. 12. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 14 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or WC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network such as IEEE 802.11. The wireless signal of these embodiments is received over the communications channel 1060 and the communications interface 1050 which are adapted for wireless communications, such as Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The exemplary embodiments can be carried out by computer software implemented by the processor 1010 or by hardware, or by a combination of hardware and software. As a non-limiting example, the exemplary embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding description has described a number of embodiments. These embodiments include the following optional features alone or in any combination, across various different claim categories and types:

Using prediction directions during intra prediction in encoding and decoding beyond −135 degrees and 45 degrees extending the prediction directions in a horizontal or vertical direction while removing some directions in the opposite direction to maintain the same number of total directions extending the number of directions both beyond −135 degrees and beyond 45 degrees the length of the shorter reference array is based on both the block width and height.

the length of the shorter reference array is one plus twice the length of the corresponding side of the block, plus a small extension.

The extension is needed since the angle parameter values are not powers of 2.

To compensate for this extension on the smaller side, the reference array size on the longer side of the block can be reduced appropriately so that the total number of reference samples required for wide angle prediction remains about the same as required for normal intra prediction.

the length of a reference array is determined based on both the height and width of the block to be encoded or decoded signaling from an encoder to a decoder which prediction directions are being used using a subset of prediction directions the block is a CU having a rectangular shape the other block is a neighboring block an angular prediction mode is mapped to a wide angle mode by a value that corresponds to the target block shape The mapping of angular modes to wide angle modes is one-to-one.

The number of wide angle directions used for a block depends on the target block shape.

intra prediction is based on the wide angle mode

A bitstream or signal that includes one or more of the described syntax elements, or variations thereof.

Inserting in the signaling syntax elements that enable the decoder to process a bitstream in an inverse manner as to that performed by an encoder.

Creating and/or transmitting and/or receiving and/or decoding a bitstream or signal that includes one or more of the described syntax elements, or variations thereof.

A TV, set-top box, cell phone, tablet, or other electronic device that performs any of the embodiments described.

A TV, set-top box, cell phone, tablet, or other electronic device that performs any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs any of the embodiments described.

A TV, set-top box, cell phone, tablet, or other electronic device that receives (e.g. using an antenna) a signal that includes an encoded image, and performs any of the embodiments described.

Various other generalized, as well as particularized, features are also supported and contemplated throughout this disclosure.

The invention claimed is:

1. A method, comprising:

predicting a video sample belonging to a rectangular block based on at least one sample of a neighboring block lying along a direction based on block shape of the rectangular block, wherein a greater number of prediction directions are available along a longer side of said rectangular block than along a shorter side of said rectangular block; and, encoding the rectangular block using intra prediction based on the predicted video sample, wherein a mapping of a regular mode to a wide angle mode is performed based on a ratio of block width to block height corresponding to a prediction direction for the rectangular block being encoded and, wherein a fixed number of prediction indices are used to indicate a range of intra prediction directions, an angular prediction mode is mapped to a wide angle mode by a value that corresponds to the target block shape and the mapping of angular modes to wide angle modes is one-to-one, the overall number of intra prediction directions is fixed, the range of intra prediction directions being adapted to a shape of the rectangular block and a range of intra prediction directions extends beyond the prediction directions for a square block, and wherein a reference array of samples above the rectangular block has length of 2W+1 and a reference array of samples left of the rectangular block has height 2H+1, where W is a width of the rectangular block and H is a height of the rectangular block and prediction directions on the longer side of said rectangular block extend to angles ranging from 45 degrees down to −135 degrees.

2. An apparatus for encoding a video block, comprising:

a memory, and a processor, configured to:

predict a video sample belonging to a rectangular block based on at least one sample of a neighboring block lying along a direction based on block shape of the rectangular block, wherein a greater number of prediction directions are available along a longer side of said rectangular block than along a shorter side of said rectangular block; and, encode the rectangular block using intra prediction based on the predicted video sample, wherein a mapping of a regular mode to a wide angle mode is performed based on a ratio of block width to block height corresponding to a prediction direction for the rectangular block being encoded and, wherein a fixed number of prediction indices are used to indicate a range of intra prediction directions, an angular prediction mode is mapped to a wide angle mode by a value that corresponds to the target block shape and the mapping of angular modes to wide angle modes is one-to-one, the overall number of intra prediction directions is fixed, the range of intra prediction directions being adapted to a shape of the rectangular block and a range of intra prediction directions extends beyond the prediction directions for a square block, and wherein a reference array of samples above the rectangular block has length of 2W+1 and a reference array of samples left of the rectangular block has height 2H+1, where W is a width of the rectangular block and H is a height of the rectangular block and prediction directions on the longer side of said rectangular block extend to angles ranging from 45 degrees down to −135 degrees.

3. A method, comprising:

predicting a video sample belonging to a rectangular block based on at least one sample of a neighboring reconstructed block lying along a direction based on block shape of the rectangular block, wherein a greater number of prediction directions are available along a longer side of said rectangular block than along a shorter side of said rectangular block; and, decoding the rectangular block using intra prediction based on the predicted video sample, wherein a mapping of a regular mode to a wide angle mode is performed based on a ratio of block width to block height corresponding to a prediction direction for the rectangular block being encoded and, wherein a fixed number of prediction indices are used to indicate a range of prediction directions, an angular prediction mode is mapped to a wide angle mode by a value that corresponds to the target block shape and the mapping of angular modes to wide angle modes is one-to-one, the overall number of intra prediction directions is fixed, the range of intra prediction directions being adapted to a shape of the rectangular block and a range of intra prediction directions extends beyond the prediction directions for a square block, and wherein a reference array of samples above the rectangular block has length of 2W+1 and a reference array of samples left of the rectangular block has height 2H+1, where W is a width of the rectangular block and H is a height of the rectangular block and prediction directions on the longer side of said rectangular block extend to angles ranging from 45 degrees down to −135 degrees.

4. An apparatus for decoding a video block, comprising:
a memory, and
a processor, configured to:
predict a video sample belonging to a rectangular block based on at least one sample of a neighboring reconstructed block lying along a direction based on block shape of the rectangular block, wherein a greater number of prediction directions are available along a longer side of said rectangular block than along a shorter side of said rectangular block; and,
decode the rectangular block using intra prediction based on the predicted video sample, wherein a mapping of a regular mode to a wide angle mode is performed based on a ratio of block width to block height corresponding to a prediction direction for the rectangular block being encoded and, wherein a fixed number of prediction indices are used to indicate a range of intra prediction directions, an angular prediction mode is mapped to a wide angle mode by a value that corresponds to the target block shape and the mapping of angular modes to wide angle modes is one-to-one, the overall number of intra prediction directions is fixed, the range of intra prediction directions being adapted to a shape of the rectangular block and a range of intra prediction directions extends beyond the prediction directions for a square block, and wherein a reference array of samples above the rectangular block has length of 2W+1 and a reference array of samples left of the rectangular block has height 2H+1, wherein W is a width of the rectangular block and H is a height of the rectangular block and prediction directions on the longer side of said rectangular block extend to angles ranging from 45 degrees down to −135 degrees.

5. The method of claim 1, wherein there are more prediction samples of neighboring blocks along the longer edge of said rectangular block.

6. The method of claim 1, wherein directions are added along the longer side of said rectangular block and directions are removed along the shorter side of said rectangular block.

7. The method of claim 1, wherein prediction modes are signalled using a flag.

8. The method of claim 3, wherein prediction modes are signalled differently based on whether the mode belongs to a most probable mode list.

9. The method of claim 3, wherein an index is used to map a prediction mode of the neighboring block to prediction modes of the rectangular block.

10. The method of claim 3, wherein a rate distortion optimization is performed to find a prediction.

11. The method of claim 3, wherein prediction directions are added along the longer side of said rectangular block and prediction directions are added along the shorter side of said rectangular block.

12. A device comprising:
an apparatus according to claim 4; and
at least one of (i) an antenna configured to receive a signal, the signal including the video block, (ii) a band limiter configured to limit the received signal to a band of frequencies that includes the video block, and (iii) a display configured to display an output.

13. A non-transitory computer readable medium containing data content generated according to the method of claim 1, for playback using a processor.

14. A signal comprising video data generated according to the method of claim 1, for playback using a processor.

15. A computer code program stored in a non-transitory computer-readable storage medium comprising instructions which, when the code program is executed by a computer, cause the computer to carry out the method of claim 3.

* * * * *